US008921794B2

(12) United States Patent
Stiens et al.

(10) Patent No.: US 8,921,794 B2
(45) Date of Patent: Dec. 30, 2014

(54) EVANESCENT WAVE ABSORPTION BASED DEVICES

(75) Inventors: Johan Stiens, Bonheiden (BE); Werner Vandermeiren, Vilvoorde (BE); Gennady Shkerdin, Moscow (RU); Roger Vounckx, Court St Etienne (BE)

(73) Assignee: Vrije Universiteit Brussel, Brussel (BE)

(*) Notice: Subject to any disclaimer, the term of this patent is extended or adjusted under 35 U.S.C. 154(b) by 142 days.

(21) Appl. No.: 13/522,732

(22) PCT Filed: Jan. 22, 2011

(86) PCT No.: PCT/EP2011/050875
§ 371 (c)(1),
(2), (4) Date: Jul. 18, 2012

(87) PCT Pub. No.: WO2011/089243
PCT Pub. Date: Jul. 28, 2011

(65) Prior Publication Data
US 2012/0286163 A1  Nov. 15, 2012

Related U.S. Application Data

(60) Provisional application No. 61/297,458, filed on Jan. 22, 2010.

(51) Int. Cl.
*G01J 5/02* (2006.01)
*G02F 1/19* (2006.01)
*G02F 1/015* (2006.01)

(52) U.S. Cl.
CPC ........ *G02F 1/015* (2013.01); *G02F 2001/0156* (2013.01); *G02F 1/195* (2013.01)
USPC ...................................... 250/340

(58) Field of Classification Search
USPC .............................. 250/340, 458.1
See application file for complete search history.

(56) References Cited

U.S. PATENT DOCUMENTS 5,451,980 A * 9/1995 Simon et al. ............... 345/88
6,034,809 A   3/2000 Anemogiannis
(Continued)

FOREIGN PATENT DOCUMENTS

EP  0249645 A1  12/1987
EP  0365766 A2  5/1990
GB  2204961 A   11/1988

OTHER PUBLICATIONS

K.W. Goosen, et al., "Grating Enhanced Quantum Well Detector", Applied Physics Letters, Dec. 15, 1985, vol. 47, No. 12, XP001206472, pp. 1257-1259.
J. Stiens, et al., "Evanescent wave modulator for medium infrared wavelengths (8-12 λm)", Proceeding of the SPIE. Physics ANS Simulations of Optoelectronic Devices XVIII, 2010, vol. 7597, 759711, XP002637013, The International Society for Optical Engineering, pp. 1-9.

(Continued)

*Primary Examiner* — David Porta
*Assistant Examiner* — Edwin Gunberg
(74) *Attorney, Agent, or Firm* — Bacon & Thomas, PLLC

(57) ABSTRACT

A device (100) is described for actively or passively modulating incident radiation, the device comprising at least one diffraction means (10) adapted for evanescent wave excitation upon irradiation with the incident radiation, and an absorption layer (40) adjacent the at least one diffraction means (10) so that the evanescent waves can interact with the absorption layer (40). The absorption layer (40) has alterable absorption properties so as to alter the absorption of the evanescent waves resulting in modulating of the incident radiation. The device (100) may be for actively modulating incident radiation thus being e.g. a modulator for laser radiation. Alternatively, the device may be for passively modulating incident radiation, thus acting as a sensing device for sensing environmental parameters.

20 Claims, 11 Drawing Sheets

(56) References Cited

U.S. PATENT DOCUMENTS 7,474,404 B2 * 1/2009 VanWiggeren ............... 356/445
2003/0016188 A1 * 1/2003 Takatori ......................... 345/32

OTHER PUBLICATIONS

International Search Report received in PCT/EP2011/050875, Jun. 24, 2011.

* cited by examiner (A)

(B)

EVANESCENT WAVE ABSORPTION BASED DEVICES

This application claims the benefit of provisional application No. 61/297,458 filed Jan. 22, 2010, the entirety of which is incorporated herein by reference.

FIELD OF THE INVENTION

The invention relates to the field of radiation modulation and detection. More particularly, the present invention relates to methods and systems using evanescent wave absorption for modulating radiation or for detection purposes.

BACKGROUND OF THE INVENTION

Amplitude modulation of optical signals plays an important role in various industrial sectors: e.g. communication, material processing. An extreme form of amplitude modulation is on/off modulation, which is the modulation format, used in pulsed laser material processing. Whereas in communication systems, the achievable modulation bandwidth is the crucial parameter, in laser based material processing it is rather the optical power handling capability. A variety of optical modulation principles exist such as electro-optic, acousto-optic, magneto-optic and modulation schemes such Fabry-Pérots modulators, Mach-Zender interferometers. In some wavelength intervals, however, none of these existing modulation principles and modulation schemes is cost effective, reliable solutions. One of these spectral intervals covers the operation window of $CO_2$ lasers. $CO_2$ lasers are gas lasers emitting mid-infrared radiation of wavelength between 9 and 11 micron. By adapting the constituents of the gas mixture these spectral intervals can be slightly extended. Emission in this spectrum and even far beyond can be achieved with the semiconductor based quantum cascade lasers. The benefits of these lasers are twofold: 1) the emitted spectrum lies in one of the atmospheric windows, i.e. 8-12 µm interval and 2) many materials absorb in this spectral region. The first benefit is important for the development of applications such as free space telecom systems and remote sensing (monitoring of atmospheric pollution e.g.). The second benefit is important in general spectroscopy (R&D and quality control in production processes) and for material processing in industrial environments as this spectral region is absorbed by many materials (metals, plastics, ceramics, silicon, polymers . . . ), for high-resolution laser assisted material processing such as cutting, welding, hole burning, marking, engraving, etc. and in the medical industry as biomaterials such as the skin do absorb these wavelengths as well.

The range and importance of laser assisted material processing in modern manufacturing is expanding at an impressive rate across many sectors in industry. Laser assisted material processing is inherently contact free. As such the problem of rapid wearing mechanical processing tools can be drastically reduced. Generally, the trend in pulsed laser assisted material processing is to use short pulses with high peak power in order to improve the edge quality. The high laser beam intensity provided by short pulse laser technology results in the vaporization-dominated material removal rather than the melt-expulsion-dominated mechanisms using longer duration pulses. This produces less thermal and mechanical shocks, less peripheral heat flow, what leads to reduced heat affected zones (HAZ) and less burn formation and hence more precise material removal. Just as important the short pulse duration produces very high peak power. This high peak power allows the laser to process difficult materials such as ceramics, etc. Due to the Q-switching mode, the peak power can be much higher than the CW power, meaning that much smaller lasers can be built to produce very high optical powers. Smaller lasers mean lower cost of ownership. Another advantage of such compact laser is the possibility to mount them directly on robotic arms.

When short powerful laser pulses can be provided at a high repetition rate, precision laser based material processing can be drastically speed up. Applications which can seriously benefit from it: the drilling of numerous small holes in paper or plastic parts without charring the edges of the paper or plastic material. Some examples are in the tobacco filtration, and in the banking and billing industries for perforating checks and other financial documents.

The existing solutions for producing short pulses is the on/off switching of the RF power of transversely excited atmospheric pressure (TEA) lasers and Q-switched $CO_2$ lasers based on the electro-optic (E-O) or Pockels effect. The peak power and the efficiency of pulses TEA lasers are limited and their pulse repetition rates have an upper limit of about 500 Hz. The existing Q-switching $CO_2$ lasers make use of the electro-optic effect: a long E-O crystal is needed due to the low electro-optic coefficient of e.g. "Cadmium Telluride" ($n^3 r_{41}=1.09\times10^{-10}$ m/V for $\lambda=10.6$ µm); high voltages (more than 5 kV for CO2 laser wavelengths) are required to change the output characteristics; Pockels modulators also need extra polarization sensitive devices inside the cavity, which is not a cost effective solution. The E-O crystal has an aperture at least larger than the laser beam. As this crystal has a wide aperture it is difficult to cool the central part, which for Gaussian-like beams is, however, the hottest part of the crystal. The most widely used electro-optic crystal in the spectral region of $CO_2$ lasers is CdTe. This material features a substantial residual radiation absorption, which means that the optical intensity which may be incident on the crystal needs to be limited, the crystal is fragile and it is generally difficult to get anti-reflection coatings to adhere well to the entrance and exciting surfaces of the CdTe modulator crystals. These films can easily be damaged when inserted into $CO_2$ laser feedback cavities. Anti-reflection coatings are used to reduce optical losses when these crystals are inserted within a laser feedback cavity to switch the cavity losses from a higher loss condition (i.e. low cavity Q) to a low loss condition (i.e. high cavity Q). Peeling and optical damaging of these coatings by the intense laser radiation is a common damage failure for these modulators when used to Q-switch $CO_2$ lasers. Other modulation principles could be considered as acousto-optical (AO) or mechanical solutions. The relatively low diffraction efficiency of AOMs makes them not suited for Q-switching applications in the spectral range of a $CO_2$ laser. Furthermore, AO-modulators are characterized by a trade-off between diffraction efficiency and damage threshold, which is a strong restriction with respect the power handling capabilities of these devices. Furthermore, the switching time is limited by the acoustic transit time through the crystal. Mechanical choppers are also characterized by relatively large switching times as compared to electro-optical solutions. Furthermore, this modulation principle is not flexible in the sense that the switching time is typically directly coupled to the rotational frequency and geometrical dimensions of the chopper blade and laser beam.

Hence, there is a need in the market of $CO_2$ laser material processing for compact, low driving power high-rep rate efficient radiation modulators with a long lifetime for Q-switching $CO_2$ lasers, which improve performance and economics of existing applications. It is desirable to make the Q-switched $CO_2$ laser lower in cost, more reliable than the present state of the art of CdTe electro-optics crystal technology without sacrificing Q-switching performance, and obtaining higher peak power and shorter pulses.

It is also known to use absorption of radiation for detecting certain physical phenomena. Numerous detection principles based on absorption of radiation are known. Detection of certain phenomena is then based on the change such phenomena have on the absorption state in the detector. Typically, such detection is performed by monitoring the absorption of a radiation beam and by coupling variation of the absorption to the occurrence of a phenomenon, e.g. a physical phenomenon. Although several absorption-based detectors have been disclosed, there is still room for a reliable detector allowing sensing of physical phenomena which influence the state of absorption of an absorption-based detector.

SUMMARY OF THE INVENTION

It is an object of embodiments of the present invention to provide good evanescent wave absorption based methods and systems for modulating or sensing. It is an advantage of embodiments according to the present invention that methods and systems are obtained actively or passively using altering of absorption properties using evanescent wave absorption. It is an advantage of some embodiments according to the present invention that systems and methods are provided based on actively modulating absorption properties using evanescent wave absorption for modulating the optical intensity of laser radiation incident on the device. It is an advantage of some embodiments according to the present invention that systems and methods are provided allowing accurate detection of phenomena, such as for example physical phenomena, e.g. detecting passive alteration of an absorption region using evanescent wave absorption.

It is an advantage of embodiments of the present invention that the evanescent wave absorption principle according to embodiments of the present invention can be implemented for detectors as well as for modulators.

It is an advantage of embodiments of the present invention that the design can be adapted for non-orthogonal angles of incidence.

It is an advantage of embodiments of the present invention that the design can be adapted for higher diffraction order modulation.

It is an advantage of embodiments of the present invention that the production of the evanescent wave absorption based device can be based on micro-electronics processing technology. As a consequence, one could benefit from scaling factors typically known for micro-electronics which can result in cost-effective mass production.

It is an advantage of embodiments of the present invention that the evanescent wave absorption based devices can be cooled more efficiently as compared to prior art due to its disk-like structure with a high surface-volume ratio. This results in higher power handling capabilities and longer lifetimes of the device.

It is an advantage of embodiments of the present invention that efficient control of switching of modulators can be obtained. For example in electrically controlled modulating absorption region layer, low steering voltages can be applied to bring the modulator from a high absorptive state to a low absorptive state. It is an advantage of embodiments according to the present invention that the power consumption needed for modulation can be drastically reduced as compared to prior art.

It is an advantage of embodiments of the present invention that in the context of modulators, design parameters can be adjusted for optimal modulation contrast for the spectral interval of the incident laser beam under consideration.

It is also an advantage of particular embodiments of the present invention that in the context of modulators, higher repetition rates and faster switching speeds can be obtained by scaling the geometry and consequently the RC-time constant of the device. One can e.g. design a matrix structure of single modulators to decrease the global time constant and potentially increases the beam width handling capabilities of the device.

It is an advantage of embodiments of the present invention that—when used as an intra-cavity Q-switch modulator—the average power level can be high, e.g. higher than at least some of the conventional prior art systems.

It is an advantage of embodiments of the present invention that in the context of modulators, the design parameters can be optimized for intra-cavity usage (e.g. Q-switch: low on-state absorption) or extra-cavity usage (e.g. maximum modulation depth).

It is an advantage of embodiments of the present invention that in the context of modulators, the devices are more compact as compared to prior art EO- and AO-modulators. This allows to be integrated easily in existing continuous wave laser cavities by replacing one of the conventional laser mirrors by the inventive Q-switch mirror. It can also result smaller and cheaper Q-switched lasers.

It is an advantage of particular embodiments of the present invention that—when implemented as a matrix structure of individual modulators—one can shape the transverse laser beam profile in according to the spatial absorption profile by applying different steering signals to the individual diodes.

It is an advantage of particular embodiments of the present invention that in the context of sensors, design parameters can be adjusted for obtaining increased sensor sensitivity for near normal incidence of the probing beam with respect to the state-of-the-art.

The above objective is accomplished by a method and device according to the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

The present invention relates to a device for actively or passively modulating incident radiation, the device comprising at least one diffraction means adapted for evanescent wave excitation upon irradiation with the incident radiation, and an absorption layer adjacent the at least one diffraction means so that the evanescent waves can interact with the absorption layer, the absorption layer having alterable absorption properties so as to alter the absorption of the evanescent waves resulting in modulating of the incident radiation.

The device may be adapted for upon evanescent wave excitation, inducing surface plasmon resonance modes along the at least one diffraction means.

The device may be adapted for modulating the incident radiation in reflection, the device comprising a reflective layer at a side of the diffraction means opposite to the absorption layer.

The device may be adapted for modulating incident polarized laser radiation.

The device may be adapted for actively modulating incident radiation, the device comprising an alteration means for altering absorption properties of the absorption layer. The alteration means may be an electrical, optical, acoustical or magnetic stimuli inducing means or a combination thereof.

The absorption layer may comprise charges, and may be integrated in a single or multiple field effect structure and wherein the state of absorption of the absorption layer may be changed electrically by depleting the charges.

The absorption layer may be or comprise of a resonant plasma layer.

The absorption layer may be or comprise a single quantum well or a quantum well stack.

The state of absorption of the absorption layer may be changed optically by means of an external excitation source due to electron-hole generation in the conduction and valence band of the absorption layer material, of which the bandgap is smaller than the photon energy of the excitation radiation.

The device may be adapted for detecting an environmental change.

The state of absorption may be directly related to an environmental or industrial process related physical parameter such that the reflected laser radiation is a measure for that parameter under investigation.

The structural properties of the components may be adapted for a given angle of incidence of the laser radiation.

The structure parameters may be adapted for modulating a given diffraction order.

The diffraction means may be a grating with a period slightly smaller than the cut-off period of a given diffraction order. The period may be 15% smaller than the cut-off period for a given diffraction order, or 10% smaller than the cut-off period for a given diffraction order or 5% smaller than the cut-off period for a given diffraction order, or 2% smaller than the cut-off period for a given diffraction order.

The device as described above may be embedded in a laser for generating Q-switched laser radiation.

The device as described above may be embedded in a detection system for detecting environmental changes.

The present invention also relates to a laser for generating Q-switched laser radiation, the laser comprising a device as described above.

The present invention also relates to a detection system for detecting environmental changes, the detection system comprising a device as described above.

The present invention also relates to the use of a device as described above for detecting an environmental change.

The present invention furthermore relates to the use of a device as described above for generating Q-switched laser radiation.

The present invention also relates to a method for actively or passively modulating incident radiation, the method comprising exciting of evanescent waves by guiding incident radiation through an absorption layer on a diffraction means, absorbing a fraction of the evanescent field in the absorption layer in the vicinity of the diffraction means depending on the state of absorption of this absorption layer, and re-radiating a non-absorbed fraction of the evanescent field in the propagating diffraction modes.

Exciting of evanescent waves may be exciting of evanescent waves by guiding incident radiation in a direction substantially orthogonally on the diffraction means and the absorption layer. Where reference is made to substantially orthogonally, the angle of incidence should be smaller than 10, smaller than 5, smaller than 3 or smaller than 1 degree from the design orthogonal angle. In a non-folded laser cavity, it is an advantage that the device operates under orthogonal incidence, such that a mirror can be substituted by the device.

The method may comprise controlling the state of absorption of an electrically controlled absorption layer of the device. Controlling the state of absorption may comprise applying an electrical field on the absorption layer and depleting, accumulating or inverting the charges of the absorption layer.

The method may comprise controlling the state of absorption of an optically controlled absorption layer of the device. The method may comprise directing radiation of the excitation source to the absorption layer and changing the free carrier density in the absorption layer material as function of the excitation source intensity.

The method may comprise measuring re-radiation of the non-absorbed fraction of the evanescent field for sensing the state of absorption of the absorption layer.

The method may be adapted for controlling the output of a laser which contains a laser resonator and an evanescent wave absorption based modulator, the method comprising inducing high optical losses in the laser cavity by evanescent wave absorption in the modulator such that the laser switches off, building up the population inversion by the laser ionization power during the off-state of the laser, and abruptly reducing the optical losses in the laser cavity to a minimum by switching the modulator to its low absorptive state such that the losses in the cavity are compensated by the propagation gain inside the cavity leading to the building up of large pulses. Large pulses may be pulses that have an output power which is more than 10, more than 100, more than 1000 times the continuous wave output power of the laser.

These and other aspects of the invention will be apparent from and elucidated with reference to the embodiment(s) described hereinafter.

Figure 1:
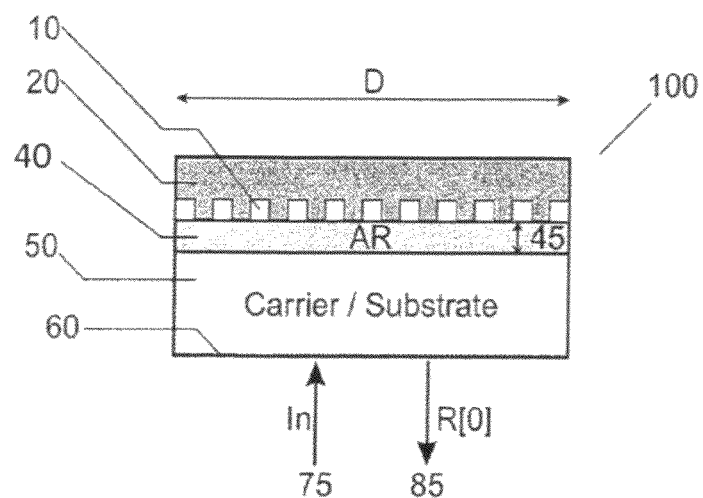
FIG. 1 shows the cross-sectional evanescent wave absorption structure comprising a diffraction grating covered with a reflective layer and an absorption region deposit on a substrate or carrier, according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the invention. The drawings described are thus only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Where in embodiments of the present invention reference is made to radiation, reference is made to all type of electromagnetic radiation, for example not only to UV radiation but also to e.g. millimeter waves.

Where in embodiments of the present invention reference is made to AR, reference is made to an absorption region or absorption layer. In embodiments of the present invention, the absorption region or layer can change in absorption state. Where in particular embodiments of the present invention reference is made to SAR or sensing absorption region or sensing absorption layer, reference is made to an absorption region or absorption layer whereby a change in absorption state is used for sensing an environmental change or parameter. Where in embodiments of the present invention reference is made to a MAR or modulated absorption region or modulated absorption layer, reference is made to an absorption region or absorption layer for which the absorption state is modulated, e.g. by a user, for influencing an external system or environment. The present invention will now be described with reference to the drawings. The characteristics and the benefits of the device based on actively or passively modulating absorption using evanescent wave absorption will be described as well as particular examples such as how the modulator structure can be applied as a Q-switch for intra-cavity usage in a $CO_2$ laser or its application in sensing.

In a first aspect, the present invention relates to a device for actively or passively modulating incident radiation, e.g. laser radiation. Actively modulating incident radiation may for example be used for switching a laser so as to generate a pulsed laser. The device then may be referred to as modulator. Such a modulator may be especially suitable for modulating lasers, such as for example for Q-switched lasers, although embodiments of the invention are not limited thereto. Passively modulating incident radiation may for example be used for sensing environmental changes or changes of the device that are not actively induced, the device thus being a sensor for environmental or device changes.

The device may be used in combination of polarized radiation, e.g. polarized laser radiation in a given wavelength region or at a given wavelength. In such cases, both TE and TM polarization may be used. In some embodiments, the device may advantageously be used in combination with TE polarized laser radiation. P- or TM-polarization may be the preferred polarization when reflective material of the grating comprises metal like materials, meaning that the permittivity of that material is negative. S-polarized (TE) waves are preferred when the permeability of the reflective layer is negative.

The device according to embodiments of the present invention comprises at least one diffraction means that is adapted for evanescent wave excitation upon irradiation with the incident radiation. The diffraction means may be any suitable periodic structure, such as for example a diffraction grating. The device, and more particularly the diffraction means, may be adapted for operating in a predetermined wavelength region or at a predetermined wavelength selected for the particular application. In case of use of a diffraction grating, the grating period may, taking into account the wavelength for which the device will be used, be selected such that a particular diffraction of the incident radiation occurs. More generally, the diffraction means is adapted so that evanescent wave excitation occurs at the diffraction means.

Evanescent wave excitation is characterized by strongly decaying electromagnetic fields along their propagation direction. For example in a reflective system, the grating period thus may be selected such that the incident radiation is such that it is larger than the cut-off wavelength of the diffraction means, such that only the zero-order mode is reflected and the higher order modes are propagating as evanescent waves. It is to be understood that the cut-off wavelength for higher diffraction orders also could be selected, such that the same principle could be used for higher diffraction orders. According to embodiments of the present invention, the device also comprises an absorption region adjacent the at least one diffraction means. The absorption region thereby is positioned such that it can interact with the evanescent waves. The thickness and the position of the absorption region typically may be selected such that the evanescent wave excitation can be felt in the absorption region. According to embodiments of the present invention, the absorption region has alterable absorption properties, which may be alterable in an active manner or in a passive manner. Active altering of the absorption can be performed when using the device as a modulator for modulating incident radiation. The latter can be obtained in that it absorbs the evanescent waves for one set of absorption properties and that it substantially does not absorb the evanescent waves for another set of absorption properties, between which selection or modulation is performed. In the latter case, the device also comprises an altering means, which may provide optical, acoustical, electrical or magnetic stimuli or a combination thereof for altering the absorption properties of the layer. Such altering means can be an electric field generator, a magnetic field generator, voltage generators, electrically driven piezo-transducers to generate acoustic waves, etc. In one embodiment, the altering means comprises an external excitation source for optically altering the absorption properties due to electron-hole generation in the conduction and valence band of the absorption layer material, of which the bandgap is smaller than the photon energy of the excitation radiation. Any physical phenomena which can, to a more or lesser extend influence the complex refractive index of the AR layer (e.g. electrically, optically, acoustically or magnetically, thermally) qualifies to be used as a driving force for modulating the absorption coefficient of the AR (for the incident wavelength), and consequently the zero or higher diffraction order of the grating.

According to some embodiments of the present invention, the evanescent wave absorption (EWA) based device comprises at the top side at least a diffraction grating covered with a reflecting layer and an absorption region (AR), whereby the multi-layer is deposited on a carrier or substrate. The bottom surface is substantially flat and adapted for receiving an incident radiation beam and guiding the entered radiation beam through the absorption layer towards the diffraction grating. After interaction with the diffraction grating, evanescent waves are excited which will be partially absorbed by absorption layer. The non-absorbed fraction of the evanescent field is reradiated towards the bottom surface where the radiation beam is coupled out.

By way of illustration, embodiments of the present invention not being limited thereto, further features and advantages of some embodiments according to the present invention are discussed below with reference to a particular embodiment. Whereas some theoretical considerations are provided, embodiments of the present invention are not limited thereto.

In one embodiment, the invention relates to active and passive devices and methods based on evanescent wave absorption. A cross-section of an evanescent wave absorption (EWA) based device 100 is shown in FIG. 1. The EWA device 100 comprises at the top side at least a diffraction grating 10 preferably covered with a reflecting layer 20 and an absorption region (AR) 40. This multi-layer may be deposited on a carrier or substrate 50. The bottom surface 60 may be substantially flat, shown as the horizontal bottom surface in FIG. 1, and may be adapted for receiving an incident radiation beam (In) 75 and guiding the entered radiation beam through the absorption layer towards the diffraction grating 10. After interaction with the diffraction grating 10, preferably covered with the reflective layer 20, and the absorption layer the radiation beam propagates back towards the bottom surface 60, and where the radiation beam is coupled out as radiation beam R[0] 85. The diameter D of the diffraction grating 10 advantageously is at least larger than the diameter associated to the minimal fraction of the optical power of the laser beam 75 that one wants to influence. This fraction can be smaller than 1%, smaller than 25%, smaller than 50%, up to 100%. The latter should be used for maximal power absorption. The materials and the geometrical parameters of various layers 10, 20 and 40 of the EWA based device 100 advantageously may be chosen such that the incident laser beam can propagate as follows through the multi-layer structure: the laser beam incident at a substantially orthogonal direction on the incoupling facet 60, refracting at that interface according to Snellius law and continues with its propagation through the layers 90, 30 and 40 where the beam is maximally transmitted, i.e. absorption and reflection are minimal. After propagation through the AR 40, the laser beam 7 hits the diffraction grating 10. This grating may be designed such that it behaves as a zero-order diffraction grating for the spectral line or spectral interval of the incident laser beam 75. For normally incident laser beams, the cut-off wavelength of a diffraction grating operating in reflection is related to the grating period $\Lambda$ and the refractive index $n_s$ of the substrate material as follows:

$$\lambda_{co} = n_s \cdot \Lambda \tag{1}$$

Figure 2:
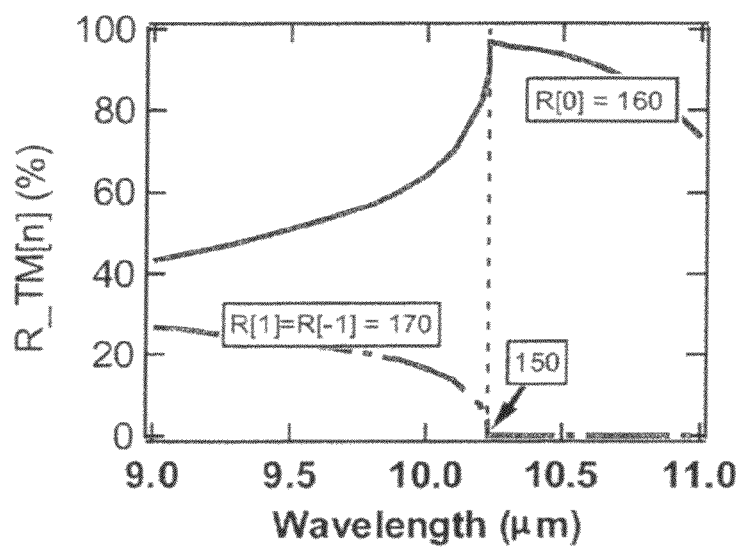
FIG. 2 shows the reflection-wavelength dependence of a diffraction grating with a fixed period having a cut-off wavelength for the first diffraction order reflection, as can be used in embodiments of the present invention.
Figure 3A:
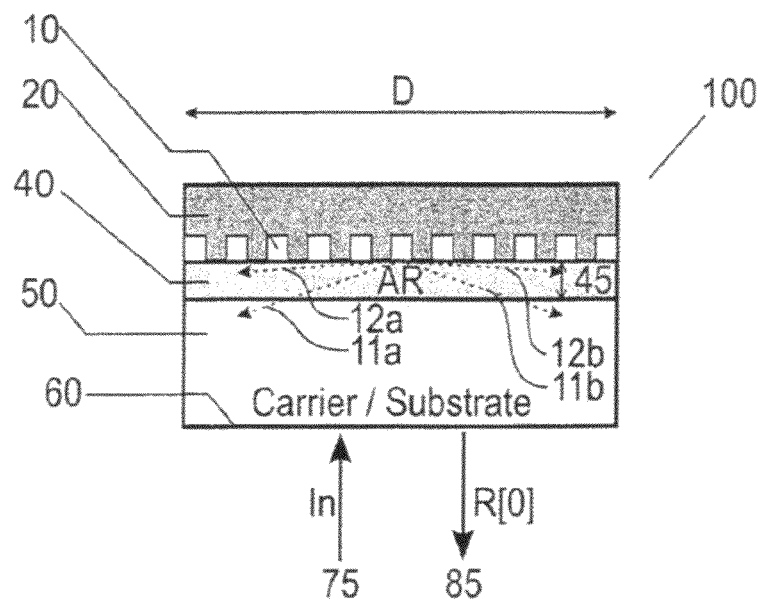
FIG. 3a shows a cross-sectional evanescent wave absorption structure comprising a diffraction grating covered with a reflective layer and an absorption region deposit on a substrate or carrier in which evanescent diffraction orders are excited for wavelengths above the cut-off wavelength, as can be used in embodiments of the present invention.
Figure 3B:
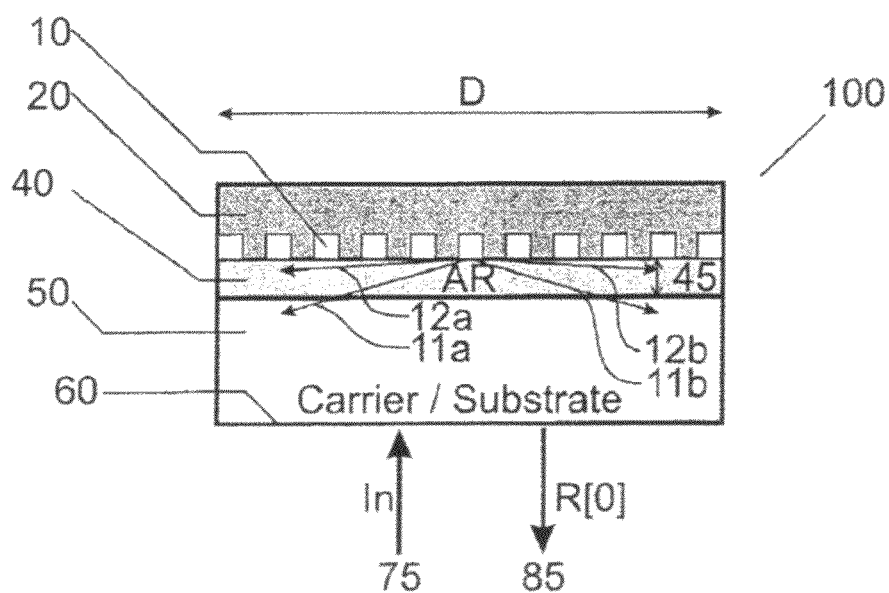
FIG. 3b shows a cross-sectional evanescent wave absorption structure comprising a diffraction grating covered with a reflective layer and an absorption region deposit on a substrate or carrier in which real diffraction orders are excited for wavelengths smaller than the cut-off wavelength, as can be used in embodiments of the present invention.

An example of the generated reflective diffraction orders for p or TM polarized radiation are shown in FIG. 2 for a diffraction grating with a period $\Lambda=3.10$ µm on a GaAs substrate. The relative reflection $R_{TM}[n]$ as function of wavelength of a diffraction grating 10 with a fixed period is shown in FIG. 2. The corresponding cut-off wavelength 150 is equal to $\lambda=10.23$ µm for the first diffraction order reflection R[1]=R[−1] 170. For wavelengths larger than the cut-off wavelength only the R[0] mode 160 is a real reflective diffraction order. In FIG. 3A again a cross-sectional evanescent wave absorption structure 100 is shown, comprising a diffraction grating 10 covered with a reflective layer 20 and an absorption region 40 deposited on a substrate or carrier 50 in which the diffraction orders are excited for wavelengths above the cut-off wavelength. All higher order reflecting diffraction modes R[±1], R[±2]; . . . ; R[±n] indicated as dotted lines 11a,b; 12a,b, . . . in FIG. 3A are evanescent waves, characterized by strongly decaying electromagnetic fields along their propagation direction. The spectral content of the incident laser beam featuring wavelengths smaller than the zero order cut-off wavelength are diffracted into at least three real reflective diffraction orders, i.e. R[0] and R[±1], as indicated in FIG. 3B by the full lines 11a,b, 12a,b, etc (thus excited at wavelengths smaller than the zero order cut-off wavelength) and featuring a real propagation constant in the substrate or carrier material; the higher order diffraction modes in this case also show evanescent wave characteristics. The fraction of the incident radiation beam diffracted into first or higher order reflective diffraction modes can be regarded as loss because these diffraction modes have a return path which is substantially different from the incoming radiation beam. More generally, the period of the grating may be selected slightly smaller than the period corresponding with cut-off for a predetermined or selected diffraction order. Higher orders than can show evanescent wave characteristics.

When the AR 40 is close enough to the diffraction grating, i.e. within the decay length or skin depth of the evanescent waves 11a,b; 12a,b, etc, these can still interact with this modulated absorption region. The value of the skin depth perpendicular to the grating-dielectric interface at which the field falls to 1/e can be estimated by the following expression:

$$\hat{z}_2 = \frac{\lambda}{2\pi}\left(\frac{\varepsilon_1 + \varepsilon_2}{\varepsilon_2^2}\right)^{1/2} \tag{2}$$

Here, $z_2$ is the skin depth, $\lambda$ is the wavelength and $\in_1$ and $\in_2$ are the dielectric permittivities of the grating and dielectric materials, respectively. As an example, one can find a skin depth of the order of 1.4 µm for a wavelength of 10.6 µm and for $\in_1$ and $\in_2$ the dielectric permittivities of Gold and GaAs, respectively.

Figure 4A:
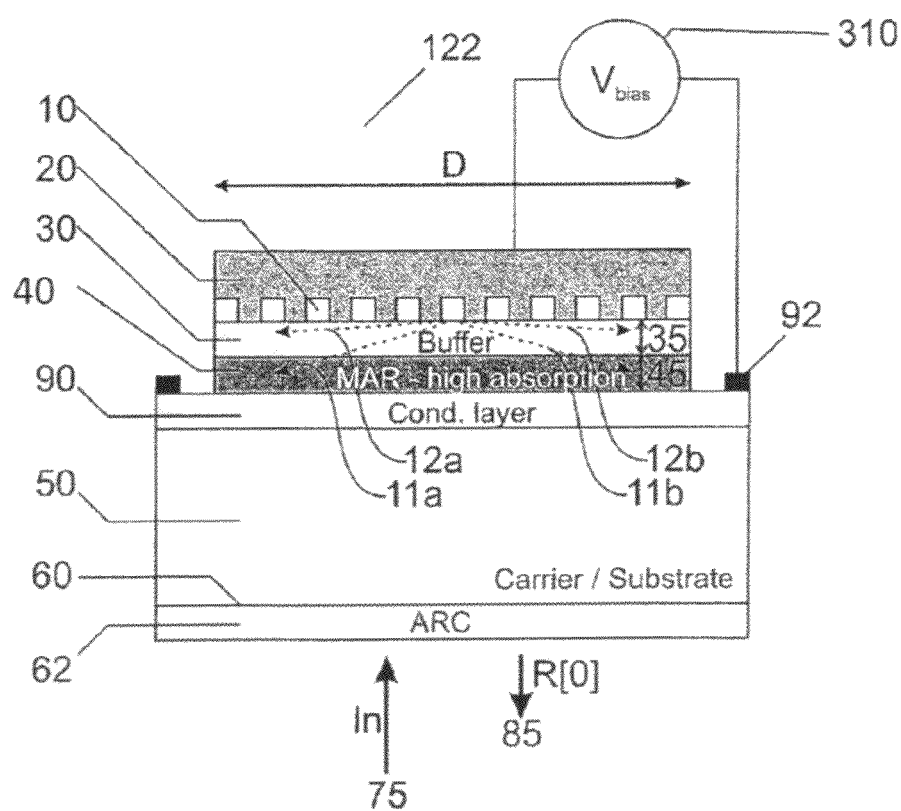
FIG. 4a shows a cross-section of an example of an embodiment according to the present invention, the example being an electrically controlled evanescent wave modulator, comprising a modulated absorption region (MAR), a sub-wavelength diffraction grating covered with a reflective layer, a buffer layer, a conductive path layer and electrodes deposit on a substrate or carrier, provided with an anti-reflective coating in which evanescent diffraction orders are excited. The evanescent waves are partially absorbed by the MAR in a high absorption state, resulting in a low zero order diffraction reflection R[0]. The state of absorption of the MAR layer is defined by the bias voltage.
Figure 4B:
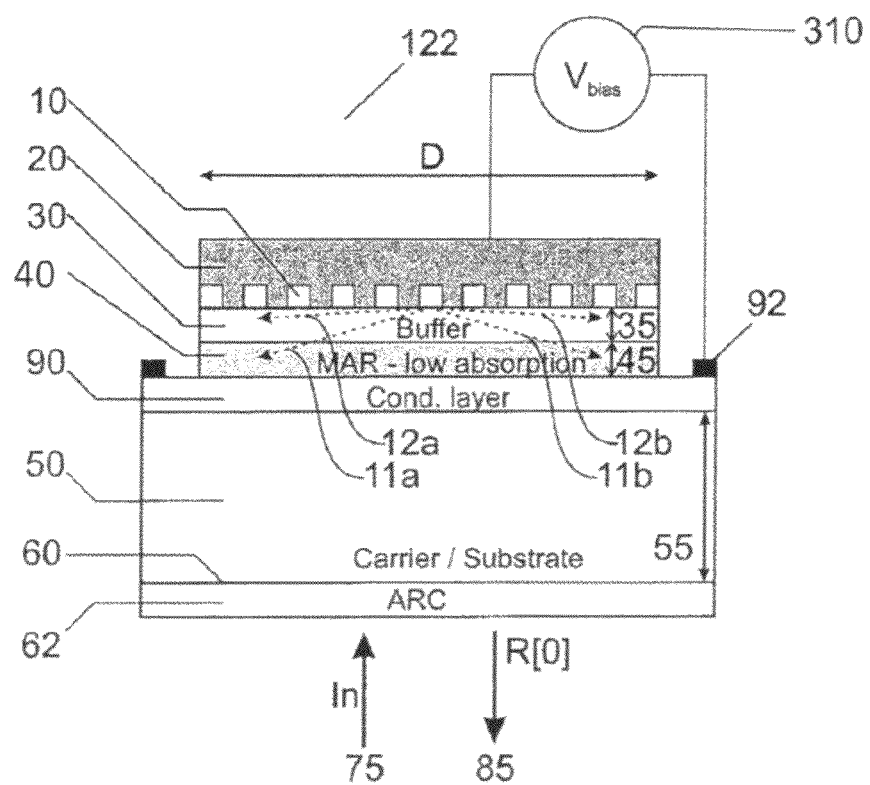
FIG. 4b shows the cross-section of an example of an embodiment according to the present invention, the example being an electrically controlled evanescent wave modulator, comprising a modulated absorption region (MAR), a sub-wavelength diffraction grating covered with a reflective layer, a buffer layer, a conductive path layer and electrodes deposit on a substrate or carrier, provided with an anti-reflective coating in which evanescent diffraction orders are excited. The evanescent wave absorption can be neglected for the MAR in a low absorption state. The evanescent waves are consequently reradiated in the $0^{th}$ order diffraction reflection R[0]. The state of absorption of the MAR layer is defined by the bias voltage.

The AR can be in a high or low state of absorption for at least one of the mutually orthogonal polarization states (TM- or TE-polarization or in another nomenclature p- or s-polarization). FIG. 4a shows the cross-section of an electrically controlled evanescent wave modulator 122 comprising an absorption region (MAR) 40, a sub-wavelength diffraction grating 10 covered with a reflective layer 20, a buffer layer 30, a MAR 40, a conductive path layer 90 and electrodes 92 deposit on a substrate or carrier 50, provided with an anti-reflective coating 62 in which evanescent diffraction orders 11a,b; 12a,b are excited. When the AR is in its high absorption state at least for one or both of the polarization states, the evanescent waves will, at least partially, be absorbed before having a chance to be reradiated and hence the zero order reflective diffraction order R[0] 85 as shown in FIG. 4A is quite small. The state of absorption of the MAR layer 40 is defined by the bias voltage 310. FIG. 4b shows the same structure but wherein the MAR is in a low absorption state. In the low absorption state of the absorption region the evanescent waves, partially tunneling into the buffer and low level absorption layer, reradiate into the zero order reflective diffraction mode R[0]. This reradiated radiation is propagating again almost perpendicular through the AR 40, hence no or minimal optical losses are induced and hence the intensity of the outgoing beam 85 is very high as illustrated in FIG. 4B. The evanescent wave absorption thus can be neglected for the MAR in a low absorption state. The state of absorption of the MAR layer 40 is defined by the bias voltage 310.

A person skilled in the art can calculate that the "range depth" (RD), which can be defined as the difference between the zero order reflective diffraction mode R[0] for the AR 40 in a low and high absorption state, can be maximized by choosing a grating period in the neighborhood of a so-called "Wood's Anomaly". These Wood Anomalies appear close to evanescent-to-propagating wave transitions (cut-off wavelength) and can be attributed to the excitation of surface plasmons along the grating surface. The excitation of surface plasmons leads to a strong increase in the amplitude of the field in the vicinity of the grating surface which is strongly absorbed by the AR 40 (in a high state of absorption). Analogously, evanescent wave absorption can be used to influence the amplitude of the higher diffraction orders when applying a super-wavelength grating. Hence, it is to be understood that the invention is not limited to zero order reflective diffraction mode modulation, but that also modulation of higher order reflective diffraction mode modulation can be used.

According to embodiments of the preset invention, the device may be sensitive to refractive index or dielectric permittivity or thickness variation in the SAR region adjacent to the grating structure whereby the thickness of this SAR can be essentially smaller than the penetration depths of the evanescent waves. In the example for the $CO_2$ laser Q-switch calculated below the sensor is sensitive to layers which are 1.000 to 10.000 times smaller than wavelength in free space.

By way of illustration, embodiments of the present invention not being limited thereto, devices and methods with particular applications are described below with reference to certain particular embodiments.

In one set of embodiments, a device making use of evanescent wave absorption as described above is provided, in which the absorption state of the absorption region 40 reflects the state of a physical parameter under investigation, such that a sensor is realized. The absorption region can be defined as a sensitive absorption region (SAR) 40. Each physical phenomenon or parameter which directly or indirectly influences the complex refractive index $n(\omega)$ of the SAR 40 and which is consequently related to the absorption state of the SAR 40 for the incident wavelength, qualifies to be measured with evanescent wave absorption based devices. Here, the reflected radiation beam which is coupled out after interaction with the AR is consequently a measure for the physical parameter under investigation.

Examples of such physical phenomena and parameters which influence the complex refractive index of the SAR layer in a more or lesser extend for a given incident wavelength are the free carrier density of the SAR (doping or electron-hole pair generation due to radiation absorption), the design parameters of quantum confined structures (e.g. QW based SAR), temperature, pressure, humidity, physical or chemical interaction at the surface of the SAR, physical or chemical binding to receptors positioned at the SAR, etc.

For the incident wavelength, the material used and design parameters of the EWA based device can be adapted such that an optimal sensitivity is reached for a given sensor application. The cross-sectional structure of such a device may be similar to the structure as illustrated in FIG. 1. The zero order reflection R[0] (indicated with 85) may then be a measure for the physical phenomenon under investigation. By means of example, one can consider a EWA structure for measuring an infrared excitation laser intensity. The SAR 40 may consist of a material with a band gap smaller that the photon energy of the excitation source. The substrate may consist of a material with a band gap larger that the photon energy of the excitation source. The complex refractive index of the SAR layer at the incident wavelength of the laser beam 75 might then be strongly influenced by the excitation laser intensity due to electron-hole pair creation inside the conduction and valence band of the SAR material 40. The free carrier density which is a function of the excitation laser intensity can lead to free carrier absorption of the incident laser beam 75.

The final reflection coefficient for the incident wavelength on the EWA structure is directly related to the absorption state of the SAR 40 and consequently can be a measure for the excitation laser intensity.

It is an advantage of some embodiments according to the present invention that the sensing can be performed at the same side of the device as the entrance side of the radiation.

In the evanescent absorption wave sensor, calibration of the sensor can be advantageously be executed by means of the TE or s-polarized beam, because this polarization hardly interacts with the SAR. The TE reflected yield the reference for the maximum reflection value possible. In conventional SPR (surface plasmon resonance) techniques, the excitation of a surface polaritons can for example be accomplished in the regime of attenuated total reflection when p-polarized radiation is incident on a metal-coated glass prism (Kretschmanns's geometry). This angle incident configuration prohibits these SPR sensors from being used to measure large sample arrays.

By way of illustration of the above particular embodiments, some sensing applications will now be discussed, embodiments of the present invention not being limited thereto.

The permittivity or complex dielectric function of a material describes how electromagnetic waves interact with it and indicate when a material features a resonance. The wavelength, frequency or energy of the sensing electromagnetic wave (radiation beam) should be chosen in accordance with the resonance features of the material or processes under study and which are positioned in the SAR region of the evanescent wave sensor. As a matter of example we differentiate below various preferred spectral ranges of the incident electromagnetic wave to interrogate the material or process in the SAR region.

UV and visible radiation can be used for example when one is targeting to sense the fundamental electronic transitions in materials (solids, e.g. transition metals or molecules, e.g. conjugated organic compounds, especially those with a highly level of conjugation). These transitions are also directly related to the colors of chemicals.

Near-infrared: ($\lambda$: 0.8-2.5 µm) can for example be preferred when one wants to sense the overtone or harmonic vibrations. Such resonances are determined by the strength of the bonds (=shape of the molecular potential energy surfaces), the masses of the constituent elements and by the associated vibronic coupling. Hence resonant frequencies can be associated to particular bond types, hence related to chemical groups. As such, simple diatomic molecules featuring only one bond, can only have stretch vibrations.

Mid-infrared (3-30 µm) can for example be preferred when one is dealing with the fundamental vibrations and their associated rotational-vibrational structures of materials.

Far-infrared and THz waves (30-1000 µm) can for example be preferred when one is targeting rotational spectroscopy of (biological) macromolecules such as amino-acids, proteins, enzymes, DNA. The resonances express the functionally relevant, global, and sub-global collective vibrational modes including base rolling, propeller twists, base breathing, base shifting. It has often been observed that these motions are biologically relevant for many aspects of biological function, ranging from the thermodynamics of association, to the transmission of allosteric information, to contributing to large-scale conformational motions.

Interrogating waves from this spectral range can for example also be used to sense the enantiotropic or stereoscopic crystalline structure of biomolecules, which plays a vital role in the functionality of biomolecules (even up to toxic). Besides, many pharmaceutical solids can exist in different physical forms, as a combination of two or more crystalline phases that have different arrangements and/or conformations of the molecules in the crystal lattice. These polymorphs can have different chemical and physical properties such as chemical reactivity, process-ability, stability, etc.

Millimeter (mm) waves ($\lambda$=1 to 10 mm) and microwaves ($\lambda$=1 to 10 mm) can for example be used for rotational spectroscopy, when the molecule under study has a permanent dipole with the centre of gravity different from the centre of charge. The incident electromagnetic field exerts a torque on the molecule, i.e. yields rotational movement. Such polar materials (or Debye materials) with long range order are characterized by a single or more relaxation times $\tau_k$. The contributions of the various relation times are weighted by the weighting functions Wk.

$$\varepsilon(\omega, T) = \varepsilon_\infty(\omega, T) + \sum_k W_k \frac{\varepsilon_s(\omega, T) - \varepsilon_\infty(\omega, T)}{(1 + j\omega\tau_k)}$$

A well known example and very important polar molecule is water ($H_2O$). It is omnipresent in the human body, in food, in many sectors of industrial production and cleaning, as humidity in many materials. The corresponding relaxation times of some important molecules are given below: Water:9 ps; alcohols: 50-1000 ps; aromatic compounds (esters, ketones, carboxyl acids, . . . ): 4-150 ps; poly-alcohols: 20-1000 ps. The corresponding resonance frequencies read as $f=1/(2\pi\tau)$. Many other examples can be found in literature.

This relaxation time ($\tau$) of the dipole of the molecules also depends on the freedom of the molecules and the size of the molecules. Hence one can sense the different states of polar molecules: 3D (=free state), or 2D, 1D or 0D.

This permittivity is also a function of the temperature and in some cases this temperature dependence can also be used for non-contact temperature sensing.

$$\in(\omega,T) = \in'(\omega,T) + j\in''(\omega,T)$$

The temperature dependence of the relaxation time reads typically as follows:

$$\tau \div \frac{v_o e^{\left(\frac{Ea}{RT}\right)}}{T},$$

liquids at higher temperatures will be more sensitive at higher frequencies. Viscosity decreases when temperature increases, hence both effects co-operate. Hence the EAW sensors also allows to sense temperatures.

A prominent example of sensing a mixture is sensing the concentration water molecules inside a material. Sensor applications include sensing humidity in gels in biomedical applications, soaps, oils, moisturizers, flagrances Processes under study may comprise: physical state changes such as: evaporation, melting, heating, drying . . . but also adsorption processes or self-assembling of thin film structures, in both cases measuring thickness changes or (bio)-chemical or molecular reactions. This includes drugs and targets, antibodies and antigens or any pair of interacting molecules . . . . One may immobilize bio-recognition elements (e.g. antibodies) in the SAR region near the grating region. When a solution is brought into contact, analyte molecules in solution bind to the molecular recognition elements, producing a change in the refractive index at the sensor surface, hence influencing the reflected intensity.

By designing a device that is utmost sensitive in the spectral range corresponding to the resonance features of the (bio)material under study—e.g. in the THz range one measures the direct change in permittivity due to any event: very slight changes of the atomic chain arrangement, mutations, conformational changes, hybridization, etc.—one can overcome some important disadvantages of the widely spread label fluorescence spectroscopy technique: i) e.g. at the production stage especially cost and time and ii) at the user stage deterioration of the fluorescence analysis due to bio-molecular conformation or changes of yield, leading to bleaching, eventually inhibit the quantification.)

In this respect label-free detection is a very attractive in many industrial and research field, and EWA sensors are preferable candidates for high-throughput screening solutions in these fields.

When high speed observation is needed (e.g. in the study of dynamical processes), one preferentially selects an optimal angle of incidence and frequency where the resonance features are most sensitive to follow the process variation by sensing the reflectivity variation at that point. When time allows, one obtains higher sensitivity by preferentially scanning over a broader spectral range sweeping around the Wood anomaly. This Wood anomaly shifts with the dielectric permittivity value of the SAR and the substrate if any available.

In one set of embodiments, the device as described above is particularly suited as modulator. The evanescent wave absorption based radiation modulator as can be obtained in this matter can operate at low voltages and can remedy the shortcomings of modulators in the 10 µm wavelength region of prior art. Such radiation modulators—also referred as the evanescent wave modulator—may be thin disk modulators and can be used outside the laser cavity as well as inside the laser cavity depending on the application. For laser based material processing the Q-switch amplification factor can be most essential, whereas in secured direct-link laser communication the repetition rate can be crucial for obtaining the highest bit rates. There is also a need for the extension of the average power of the existing Q-switching $CO_2$ lasers. The prior art ones do not produce more than 20 W average power. The Q-switch lasers according to some embodiments of the present invention allow much higher power levels and also high bit rates in communication systems. In some embodiments of the present invention, evanescent wave absorption based devices as describes above thus can be used in which the absorption state of the absorption region AR 40 is actively controlled such that a modulator is realized. Hence, embodiments of the present invention also relate to a device and a method for modulating the intensity of a radiation beam incident on it. The absorption region AR can then be defined as a modulated absorption region (MAR) 40. Any physical phenomena which can, to a more or lesser extend influence the complex refractive index of the MAR layer 40 (e.g. electrically, optically, acoustically or magnetically) qualifies to be used as a driving force for modulating the absorption coefficient of the MAR 40 (for the incident wavelength), and consequently the zero or higher diffraction order of the grating.

In one example in case of electrical modulation an additional buffer layer 30 can be added in between the diffraction grating and the MAR layer 40. Furthermore, an additional conductive path layer 90 in between the substrate and the multilayer structure might be used as indicated in FIG. 4A. By applying an electrical field on the MAR layer 40, one can control the absorption level by means of depletion as described in more detail in the section of the resonant plasma absorption region. Various implementations of the MAR layer 40 may be provided. By means of example, two further implementations are described for the case of electrical modulation, namely a resonant plasma layer and a quantum well. Furthermore, one example is described for the case of an optically controlled MAR layer 40. It should be noted that other implementations of the MAR layer 40 are possible whether or not based on different physical modulation principles (e.g. electrically, optically, acoustically or magnetically). Therefore it should be understood that the invention is not limited to the stated implementations of the MAR layer 40 or combinations thereof.

In a first exemplary embodiment, a modulated absorption region based on a resonant plasma layer is established in the device. The modulated absorptive layer MAR 40 can be a resonant bulk plasmon absorption layer, which is characterized by the following dielectric permittivity value $\in_{rp}$ for the spectral laser lines/intervals $\omega_{int}$ of interest which will be modulated $$\in_{rp}(\omega_{int}) \approx 0 \qquad (3)$$

The details of the expression of the dielectric permittivity depend on the spectral interval under consideration. E.g. for (doped) bulk semiconductors exposed to the spectral lines of a $CO_2$ laser the following Drude expression is valid:

$$\varepsilon_e(\omega) = \varepsilon_1\left(1 - \frac{\omega_p^2}{\omega^2}\right) + i\frac{\omega_p^2 \varepsilon_1}{\omega^3 \tau} \qquad (4)$$

$$\omega_p^2 = \frac{n_o q^2}{m_1 \varepsilon_1}$$

in which $\omega$ is the frequency of the spectral laser line, $\omega_p$ the plasma frequency, $n_o$ the free carrier (electron and/or hole) density, $m_1$ the optical effective mass of the free carriers (electrons/holes) inside the semiconductor, $\tau$, the electron energy relaxation time, q, the electron charge, $\in_1$ the dielectric permittivity of the undoped bulk semiconductor at the considered wavelength. One can easily relate a wavelength to this pulsation.

$$\lambda_p^2 = \frac{4\pi^2 c^2 m_1 \varepsilon_1}{n_o c^2} \qquad (5)$$

The resonance condition related to the existence of free bulk carriers is called the bulk plasmon resonance.

When one manages to change one of the material properties (effective mass, free carrier concentration) or geometrical properties (thickness, angle), one can construct a sensitive modulator for changing the reflection properties of radiation incident on the resonant plasma layer.

The grating region can be designed such that the evanescent waves are excited with a substantially large efficiency and, in case of electricall modulation, for a buffer layer smaller than the propagation length of the evanescent diffraction orders, the TM-polarized evanescent diffracted waves will be absorbed with a high efficiency. The amount of absorption is determined by the thickness of the resonant layer and the thickness of the buffer layer. Evanescent TE-polarised diffraction orders are hardly absorbed by the resonant plasma layer. Due to the very different behavior between TM and TE polarized radiation, this device can be used as a polarizer.

Hence laser line(s) under consideration determine(s) which material and which free carrier concentration is needed to fulfill the bulk plasmon resonance condition. One can verify that different binary, ternary and quaternary semiconductors like GaAs, AlGaAs, InGaAs, InSb, etc. can be brought in such condition (by doping, or carrier injection) that the plasma resonance in this material coincides with one of the resonance lines of a $CO_2$ laser (typically a discrete wavelength between 9.3 and 11.0 µm. It is understandable that by adapting doping concentration or the material, that other wavelength regions can be envisioned and in particular that also larger wavelength regions can be envisioned.

Picking an interesting III-V semiconductor like GaAs, one ends up with doping concentrations of the order $3-10 \times 10^{18}$ $cm^{-3}$ for the modulation of the standard resonance line $\lambda = 10.611$ µm of a $CO_2$ laser. For such doping concentration the band structure of GaAs forces the person skilled in the art to take into account the different conduction bands of GaAs ($\Gamma$, X, L) for the calculation of the plasma resonance effect. Also the peculiarities of the different bands should be taken into account such as band non-parabolicities and anisotropies. These quantum-mechanical calculations have been described in literature.

Figure 5:
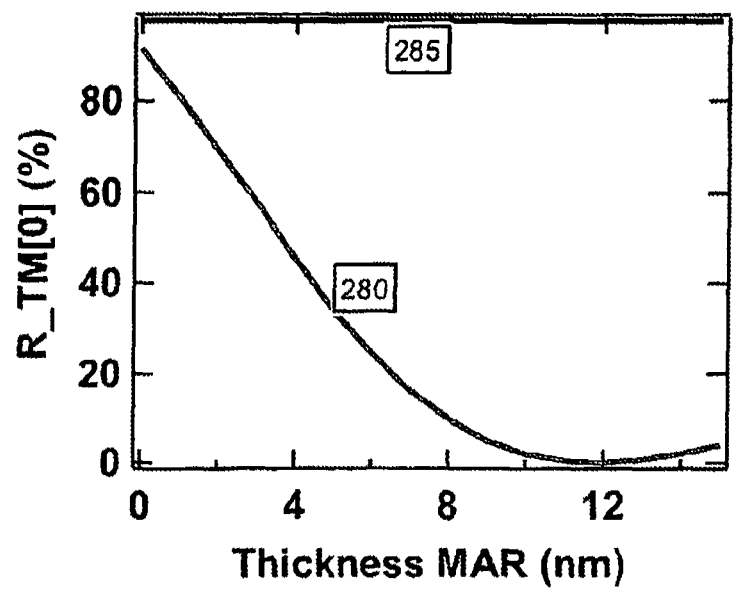
FIG. 5 shows the influence of the thickness of the resonant plasma layer (MAR) on the zero order diffraction reflection for different doping concentrations and polarizations (TE and TM), as can be used in embodiments of the present invention.
Figure 6:
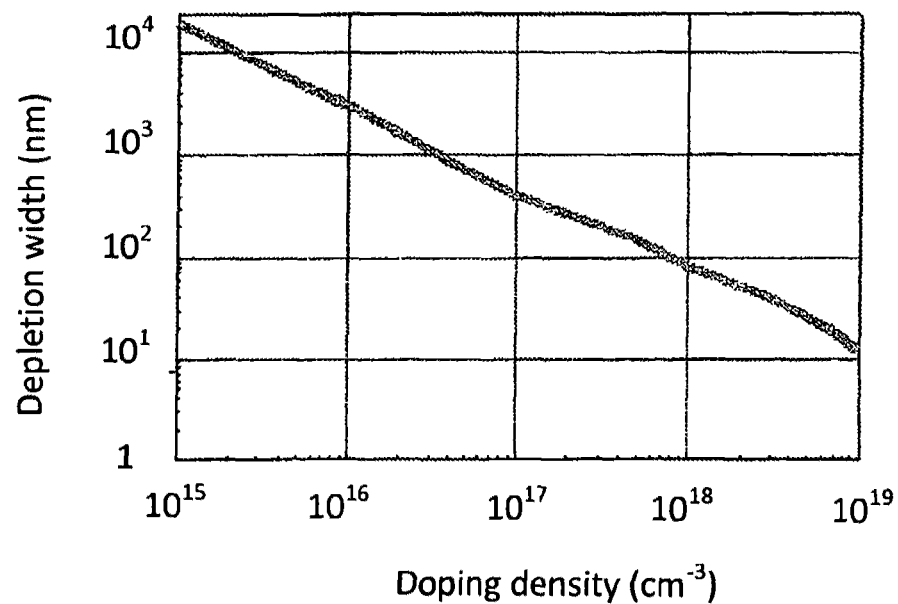
FIG. 6 shows the maximum depletion width versus the doping concentration, as can be used in embodiments of the present invention.

One way to achieve the absorption modulation is by modulating the electrical width 45 of the MAR layer 40 by means of an electrical field. The response curves of the electrical thickness modulation are shown in FIG. 5 for both states of radiation polarization (TM and TE). FIG. 5 shows the influence of the thickness 45 of the resonant plasma layer (MAR) 40 on the zero order diffraction reflection $R_{TM}[0]$ 85a for different polarizations (TE285 and TM280) (doping concentration was $8.5 \cdot 10^{18}/cm^3$). The simulations show that for the TE polarization (curve 285), there is nearly no interaction with the MAR layer 40. For each thickness of the MAR layer 40 the zero order reflectivity R_TE[0] is very high, about 97.5% for this case. Incident TM polarized radiation (curve 280), however, is very dependent on the electrical thickness variations of the MAR layer 40. The high absorption state (low zero order reflectivity state) corresponds to a thick resonant plasma layer, the low absorption state (high zero order reflectivity state) to a thin resonant layer. In the state of minimal absorption, the maximum reflectivity occurs, in this case equal to 91.5%. The actual value of this maximum reflectivity depends on the details of the diffraction grating, the steepness of the zero order reflectivity curve 280 depends on the details of the diffraction grating and on the material parameters of the MAR layers 40. When the full reflectivity change needs to be exploited, then the material parameters of the MAR layers 40 need to be chosen such that the minimum reflectivity is obtained for a resonant plasma layer thickness smaller than the maximum depletion width of the MAR layer 40. FIG. 6 shows the relationship between the maximum depletion width and the doping concentration in n-GaAs. For doping concentrations in the range $3 \times 10^{18}$ $cm^{-3}$ to $10 \times 10^{18}$ $cm^{-3}$ the maximum depletion widths are respectively of the order of 40 to 10 nm.

The actual depletion modulation of the electrical thickness of the electron layer can be preferably obtained by integrating the MAR layer 40 in to a diode structure as depicted in FIGS. 4A and 4B. The diode structure comprises the reflecting layer 20 of the diffraction grating which also plays the role of electrical contact, the buffer layer 30 and the MAR layer 40, which is connected to the outside world via the metal contact 92. Various embodiments are possible: in case the buffer layer is intended to behave as an insulator, e.g. materials such as undoped $Al_xGa_{1-x}As$ layer, the diode can be considered as a metal-insulator-semiconductor (MIS) diode. The insulator-semiconductor can be a homo-junction or a hetero-junction. An $Al_xGa_{1-x}As$ hetero-junction yields the best electrical insulation characteristics but yields the smallest penetration of the evanescent waves, in case of a homo-junction GaAs/n-GaAs interface electrical insulation characteristics are less ideal, but optically it yields the best modulation contrast. In the diode structure, the buffer layer may be divided in two sub-layers, a first sub-layer is insulating, and a second sub-layer is a p-type semiconductor. This p-type layer is partially in contact with the reflecting layer 20. The obtained structure is a P-I-N diode with a very small I-part.

Both diode structures can be used to deplete the electron concentration of the MAR layer 40 by reverse biasing the diode structure. The needed voltage to completely deplete the diode structure depends on the thickness of the insulating layer. Typical voltages to deplete the MAR layers 40 are of the order of a few volts up to a few tens of volts (the thickest insulating layers, the largest voltages). It is preferred that the initial thickness of the grown resonant bulk plasmon layer should be equal to or slightly thinner than the maximum depletion width of the electron layer which depends on the used doping concentration as illustrated by FIG. 6: the larger the doping concentration, the smaller this maximum depletion width.

The required depletion voltages for embodiments of this invention are drastically lower than the ionization voltage of several kV of the gas medium of a $CO_2$ laser. These depletion voltages are also drastically smaller than the voltages needed for commercially existing EO modulators (500-5000 V). These driving characteristics are very promising to turn a $CO_2$ laser into an easily computer controlled and flexible-machining tool by means of the preferred embodiments.

When large reflection variations are required for particular laser cavities, the simple hetero-junction diode structure, called p-I-n diode can be extended to multiple diodes structures in the form of a p-I-n-I-p or n-I-p-I-n structures. These multiple diode structures allow thickness variations of the resonant plasma, which are larger than achievable with a single hetero-junction diode structure. In the p-I-n-I-p structure the thickness of the resonant layer is at least larger than the maximum depletion width of the n-side of a single diode structure. In the n-I-p-I-n structure one has two n-layers each having a thickness, which is about that of a single hetero-junction diode. In this case the thickness of the inner p-structure should be sufficient such that a large resistance does not deteriorate the speed. Hence, by applying a single reverse bias voltage to both diodes of the n-i-p-i-n or p-i-n-i-p structures, one can increase the reflection range significantly such that the maximum depletion width limitation is bypassed. The penalty one has to pay is a doubled reverse bias current.

Figure 7:
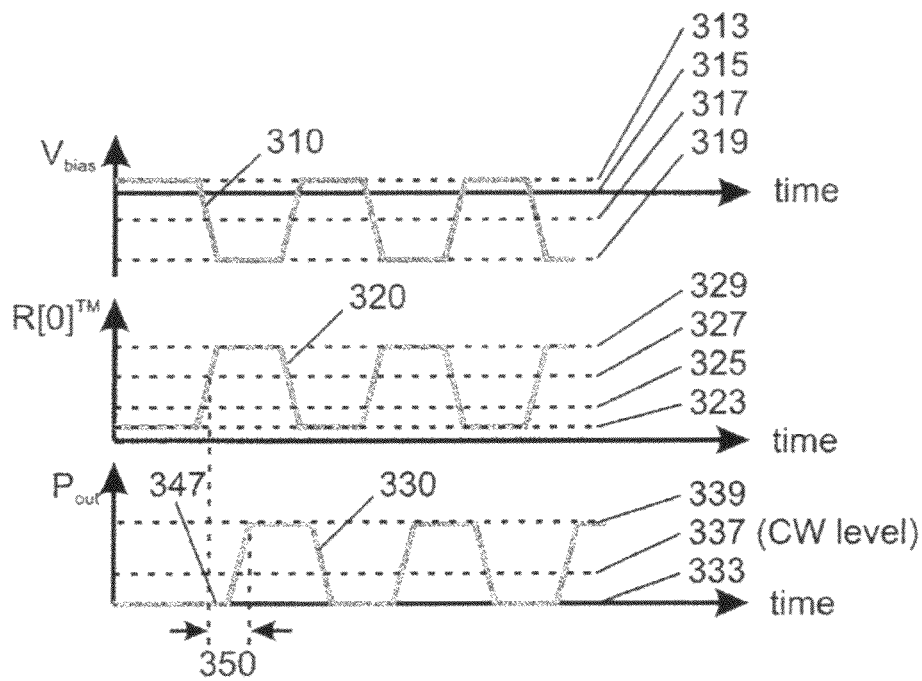
FIG. 7 shows an example of the relationship between the applied reverse bias voltage, the reflection and the output power of the laser in case of intra-cavity usage of the evanescent wave modulator, as can be used in embodiments of the present invention. The bias voltage curve changes between the forward bias voltage level and the maximum reverse bias voltage level. Consequently, the reflection curve changes between the minimum and maximum reflection value. Hence, the laser is switching between the off-state and the maximum peak power reached due to Q-switching. This power level may be much larger that the continuous wave power level.

The temporal evolution of the electrical and optical characteristics of the exemplary modulator is shown in FIG. 7. FIG. 7 shows the relationship between the applied reverse bias voltage, the reflection and the output power of the laser in case of intra-cavity usage of the evanescent wave modulator 120. Under zero-bias condition, voltage level 315 on voltage curve 310, the resonant electron gas in the MAR 40 has a large electrical thickness, and hence a high absorption state or low reflection state 325 on reflection curve 320. Due to the built-in voltage of the diode structure it is possible to further increase the thickness of the electron gas layer of MAR 40 by a slightly forward bias voltage level 313 such that the R[0] value really reaches its minimum reflection value 323. By applying the maximum reverse bias voltage 319, the maximum reflection coefficient 329 is obtained. In other words, when the bias voltage curve 310 changes between the forward bias voltage level 313 and the maximum reverse bias voltage level 319, the reflection curve 320 consequently changes between the minimum reflection value 323 and the maximum reflection value 329. Hence, the laser is switching between the off-state 333 and the maximum peak power 339 reached due to Q-switching. This power level may be much larger than the continuous wave power level 337. The delay between the electrical input and the optical reflection coefficient is determined by the RC-time constant of the modulator.

In another exemplary embodiment, the device is a quantum well based MAR. The modulated absorptive layer (MAR) 40 may be a single or multiple quantum well structure. Calculations of the dielectric permittivity $\varepsilon_{zz}^w$ of the quantum well (QW) can be performed in the framework of the effective mass method. Equation 6 gives the dielectric permittivity for a z-polarized incident optical field, propagating along the x/y-axis with z perpendicular to the structure planes:

$$\varepsilon_{zz}^w = \varepsilon_{00} - \frac{4\pi n_0 q^2}{m_e \omega^2} - \frac{4\pi q^2}{\hbar^2 \omega^2 SL} \sum_{v,vl} \frac{(f(E_v) - f(E_{vl}))(E_v - E_{vl})^2 |\langle v|z|v_l \rangle|^2}{E_v - E_{vl} + \hbar\omega + i\Gamma_{vvl}} \quad (6)$$

Here, $\varepsilon_{00}$ is the dielectric permittivity of the undoped GaAs, $n_0$ is the free electron concentration, $\omega$ is the electromagnetic wave angular frequency, $m_e$ is the effective mass of free electrons, S is the transverse area of the quantum well layers, v and $v_l$ are the electron state quantum numbers in the quantum well, Ev and f(Ev) are the electron energy and distribution function of electrons in state v, respectively, $\Gamma_{vvl}$ stands for the broadening of the resonant transition v→$v_l$ and $\langle v|z|v_l \rangle$ is the intra-subband dipole moment associated to the resonant transition v→$v_l$. A person skilled in the art will find that to realize a high absorption coefficient at a well-defined optical frequency, one should decrease the real part of the quantum well refractive index which simultaneously increases the imaginary part of the refractive index. This can be realized near the subband resonance when the photon energy is slightly larger than the difference between the first and second quantum well level energies. This is realized for a well-defined quantum well width in function of the wavelength. The effective absorption efficiency can be modulated by depleting the QW.

Figure 11A:
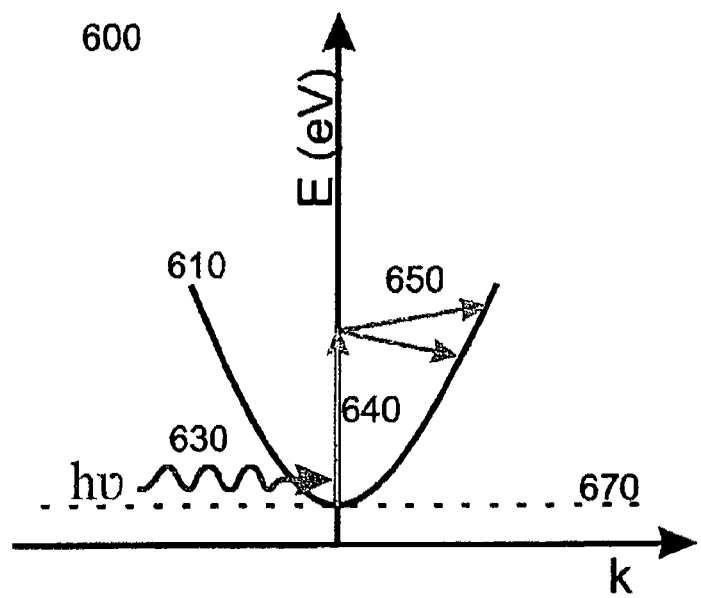
FIG. 11a shows the schematic conduction band structure of GaAs (E(k) diagram), as can be used in embodiments of the present invention. The bulk plasmon resonance absorption is illustrated by arrows. The vertical transitions in the E(k) diagram are associated to the electron-photon interaction probability. The transitions along the k-axis are associated to the scattering potential (e.g. phonon impurities).
Figure 11B:
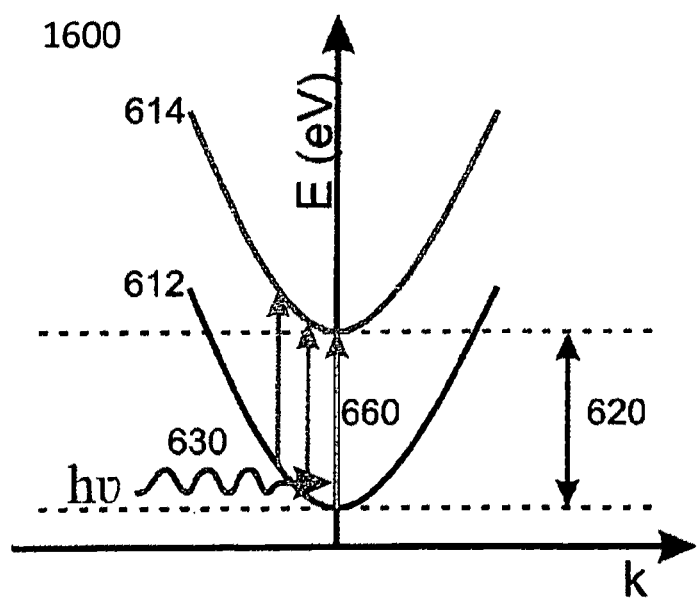
FIG. 11b shows the schematic conduction band structure of a quantum well in which an intra-subband absorption resonance (vertical transitions in the E(k) diagram) occurs for photons with an energy slightly higher that the energy difference between the first and second quantum well energy level, as can be used in embodiments according to the present invention.

The absorption efficiency in the resonant plasma layer completely relies on free carrier absorption (described by the $2^{nd}$ order perturbation theory) which is proportional to the probability of electron-photon interaction (vertical transition in the E-k diagram) and the scattering potential (e.g. phonon impurity) for the electron in the crystal. In addition to this absorption mechanism, a QW features an intra-subband absorption resonance for even-odd and odd-even energy level transitions which improves the absorption efficiency significantly. The band diagrams corresponding to bulk resonant plasma absorption and the intra-subband absorption resonance of a QW are schematically illustrated in FIGS. 11*a* and 11*b*, respectively. FIG. 11*a* shows a schematic structure 600 of the conduction band 610 structure of GaAs (E(k) diagram). The bulk Plasmon resonance absorption is illustrated by arrows. The vertical transitions 640 in the E(k) diagram are associated to the electron-photon interaction probability. The transitions along the k-axis 650 are associated to the scattering potential (e.g. phonon impurities). Incident photons 610 with energy hv are also shown as well as the lowest energy level 670 for the conduction band. FIG. 11*b* shows the schematic conduction band structure 1600 of a quantum well with different subbands 612, 614. An intra-subband absorption resonance (vertical transition 660 in the E(k) diagram) occurs for incident photons 630 having an energy hv, slightly higher than the energy difference 620 between the first and second quantum well energy level.

Furthermore, as was stated before, the spectral window of operation in the case of the bulk plasmon resonance absorption inside the MAR layer 40, is strictly limited to minimum plasma wavelengths which can be obtained in bulk semiconductors, i.e. the smallest wavelengths than can be modulated are of the order of 10 µm. Larger wavelength can be modulated by decreasing the doping concentration or by choosing materials with larger effective masses and or by using p-doped substrates. Hence, a preferred way to realize modulator structures for smaller wavelengths but also for larger wavelengths is by exploiting the absorption characteristics of quantum well structures in the MAR region 40, where the absorption spectrum can be modulated by applying an electrical field.

Figure 8:
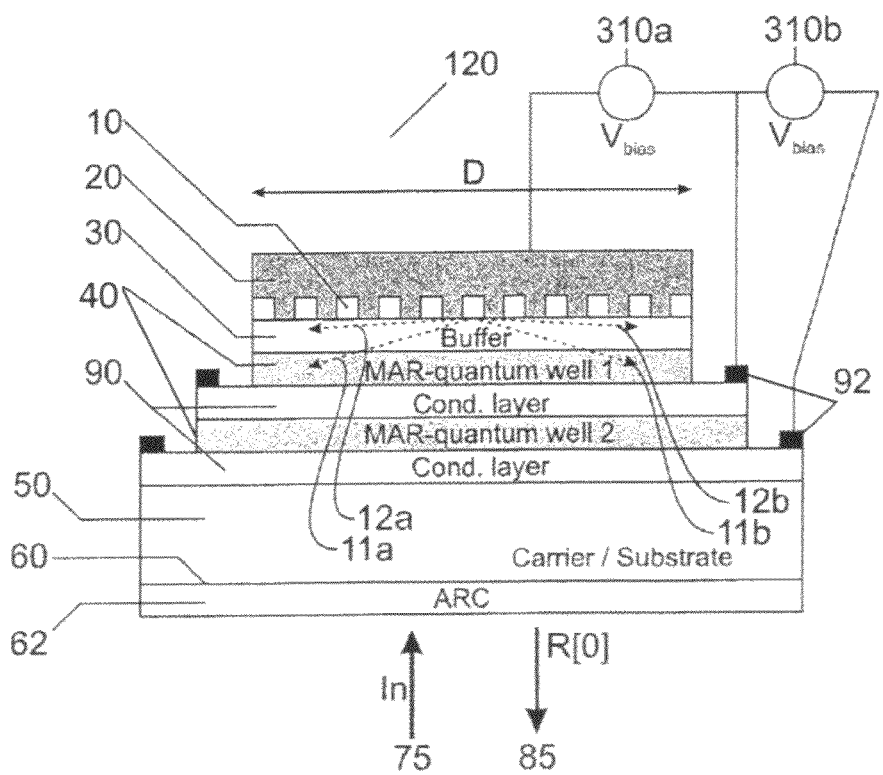
FIG. 8 shows the cross-sectional evanescent wave modulator structure with electrically modulated absorption regions (MARs) consisting of two quantum wells, comprising a sub-wavelength diffraction grating covered with a reflective layer, a buffer layer, two quantum wells, two conductive path layers and electrodes deposit on a substrate or carrier, provided with an anti-reflective coating in which evanescent diffraction orders are excited, as can be used in embodiments of the present invention.

Increasing the number of QWs leads to a sub-linear increase of the modulation depth as the evanescent waves are characterized by an exponentially decaying field orthogonal to the grating plane. Nevertheless, for few QWs, adding an additional QW might still have a significant impact on the modulation depth. Unfortunately, the electrical field needed to deplete the QW-stack scales approximately with the number of QWs. In analogy to the p-i-n-i-p and n-i-p-i-n structures described above in de context of the resonant plasma layer, one can provide conductive path layers in between the QWs or QW-sub-stacks such that, by applying a bias voltage to the individual QW or QW-sub-stacks, one can reduce the required field for full depletion of all QWs. This is equivalent to an electrically parallel connection of QWs instead of a series connection. By means of example, this principle is illustrated in FIG. 8 for the case of a double quantum well. FIG. 8 shows the cross-sectional evanescent wave modulator structure 120 with electrically modulated absorption regions (MARs) 40 consisting of two quantum wells, comprising a sub-wavelength diffraction grating 10 covered with a reflective layer 20, a buffer layer 30, two quantum wells 40, two conductive path layers 90 and electrodes 92 deposit on a substrate or carrier 50, provided with an anti-reflective coating 62 in which evanescent diffraction orders 11$a,b$; 12$a,b$ are excited.

Another particular embodiment is a device wherein modulation of the absorption region is optically induced. The plasma resonance condition can be influenced as described in equation (6) by means of an optical source. In this embodiment the required numbers of free carriers to bring the device 124 in a high absorption state, are optically generated by electron-hole generation inside the conduction and valence band with an excitation radiation source 450 emitting a substantial amount of photons 460 with energy larger than the band gap of the MAR material 40. It is required that sufficient optical excitation power reaches the MAR layer 40 in order to switch the device of a state of low absorption to a state of high absorption. This can be accomplished in two different ways: or choosing a substrate or carrier material 50 which does not absorb the photons emitted by the excitation source with corresponds to a material having a band gap larger than the band gap of the MAR material 40 or thinning the substrate layer 50 in such way that the absorption lengths of the excitation spectrum inside the substrate material is substantially larger than the physical thickness 55 of this layer.

The required power to generate sufficient free carriers depends on material properties of the substrate and the MAR layer 40. A person skilled in the art can easily calculate the required optical power density to realize free carrier concentrations to satisfy the resonance condition of equation (5) by means of equation (7).

$$\delta N = \eta(1-R) \cdot \alpha \cdot S \cdot \lambda p \cdot \tau \frac{P}{A \cdot h \cdot c_0} \quad (7)$$

where $\delta N$ is the carrier concentration change, h is Planck's constant, $c_0$ is the speed of radiation in vacuum, $R(\lambda)$ is the surface reflectivity, $S(\lambda)$ is the relative spectral response of the semiconductor material exhibiting a peak response at the optical wavelength $\lambda p$, n is the internal quantum efficiency, $\tau$ is the excess carrier lifetime, P is the optical power and $\lambda$ is the illuminated area. For a Q-switch device operating at 10.6 µm wavelength and comprising a GaAs MAR layer 40, one can calculate that the resonance condition can be obtained with an optical intensity of about 3 kW/cm$^2$ for an excitation laser emitting around a wavelength of 0.5 µm. In this embodiment the laser is switched off by means of the optical excitation.

Figure 12:
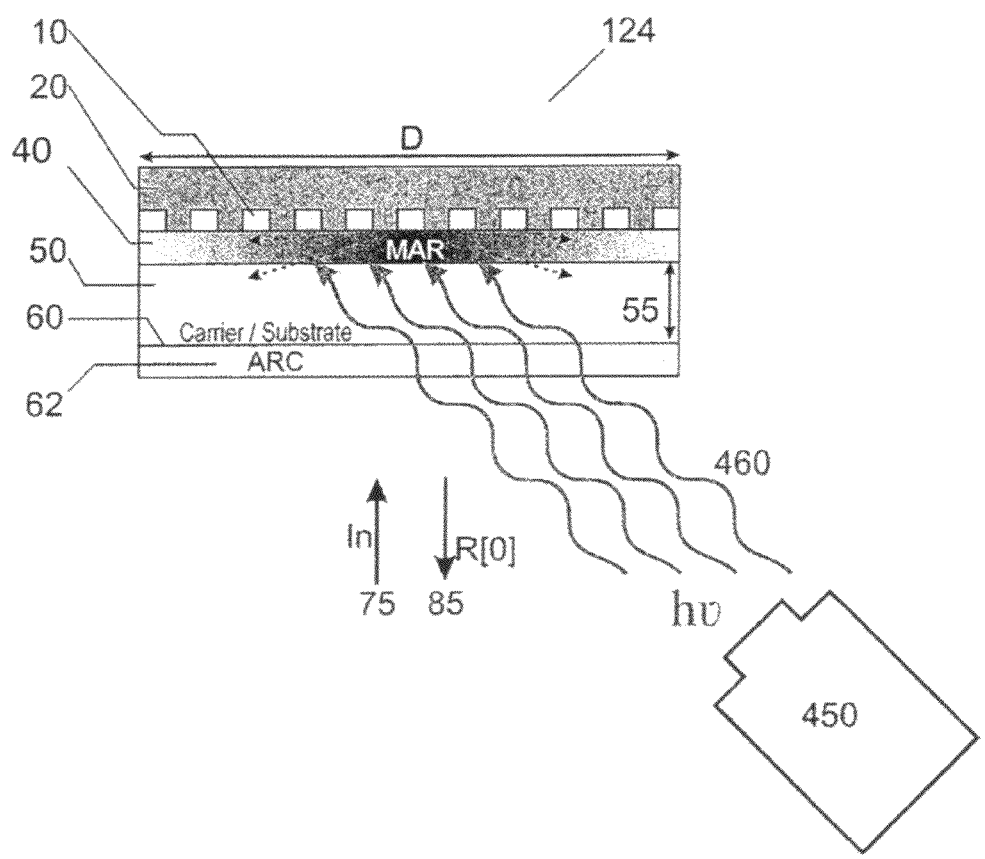
FIG. 12 shows the cross-section of an optically controlled evanescent wave modulator according to an embodiment of the present invention, comprising a modulated absorption region (MAR), a sub-wavelength diffraction grating covered with a reflective layer deposit on a substrate or carrier, provided with an anti-reflective coating in which evanescent diffraction orders are excited. The state of absorption of the MAR layer for the incident laser beam is controlled by means of an external excitation source. The final zero order diffraction reflection will be a function of the excitation source intensity.

This is essentially the same as the example given in the "evanescent wave absorption based sensors"-section. The aim here is to use a given excitation laser source 450 as depicted in FIG. 12 to modulate the absorption coefficient of the MAR layer 40, whereas when used as a sensor, the aim is to measure the refractive index change of the respective SAR layer 40 due to an external phenomena, which is the excitation laser source in the given example. FIG. 12 illustrates an external excitation laser source 450 in combination with an optically controlled evanescent wave modulator 124, comprising an absorption region (MAR) 40, a sub-wavelength diffraction grating 10 covered with a reflective layer 20 and a MAR 40 deposit on a substrate or carrier 50, provided with an anti-reflective coating 62 in which evanescent diffraction orders are excited. The state of absorption of the MAR layer 40 for the incident laser beam 75 is controlled by means of the external excitation source 450. The final zero diffraction reflection 85 will be a function of the excitation source intensity 460.

By way of further illustration, some additional advantages and design considerations are further discussed, applied to electrically controllable evanescent wave absorption modulators, although embodiments are not limited thereto.

Figure 13:
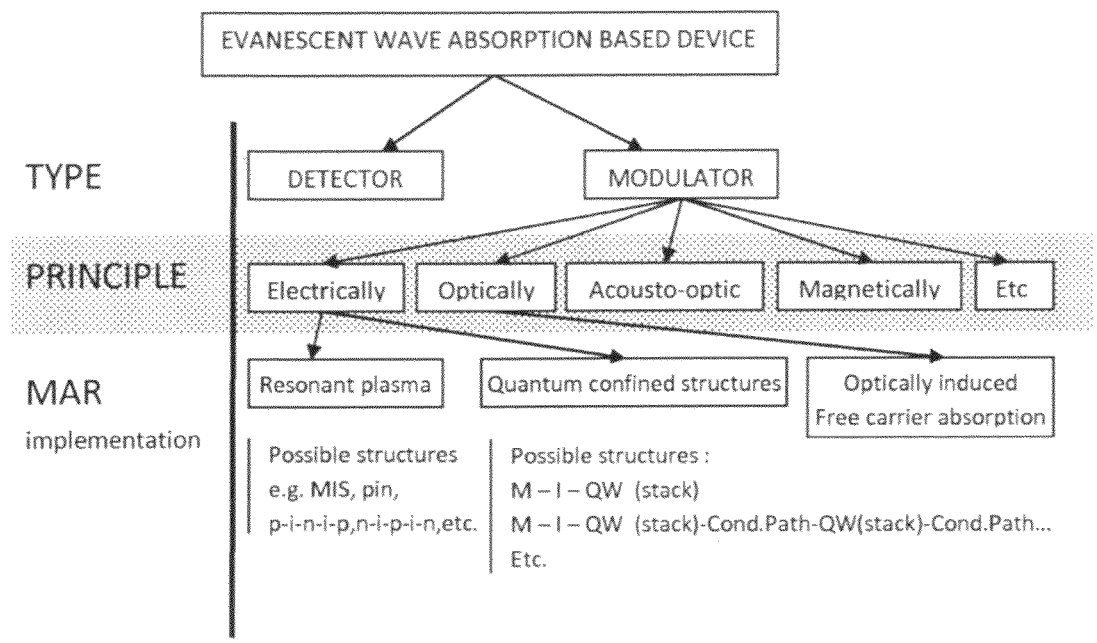
FIG. 13 shows the cross-section of an electrically controlled evanescent wave modulator according to an embodiment of the present invention, comprising a modulated absorption region (MAR), a sub-wavelength diffraction grating covered with a reflective layer, a buffer layer a conductive path layer and electrodes deposit on a substrate or carrier, provided with an anti-reflective coating. On top of the diffraction grating a heat sink is provided for efficient cooling.

An advantage of the EWA structure 100 is that its geometry may be a thin disk like structure having a large surface to volume ratio which is the ideal structure to cool. On top of that, the absorbing parts of the structure—the diffraction grating 10 and absorption layer 40 are at the backside of this thin disk which operates in reflection. Hence the absorbing regions are at (sub)micrometer distance from the backside of the structure which can be passively (see e.g. the heat sink 5 in FIG. 13) or actively cooled with the most advanced heat sinks or cooling means. A top metal is preferably provided in order to make the top surface flat for maximum exchange of heat between the absorption region and the heat sink. Such effective cooling means cannot be applied to prior art electro-optic or acousto-optic modulators because the latter modulators are always bulky and operate in a transmission mode. Residual absorption in the undoped substrate 50 can be further reduced by substrate thinning. An extra benefit of this thinned substrate case is that the heat evacuation can be more effectively organised.

The area of the device can be as small as the diameter of the laser beam. Such a compact structure easily scales with the optical power of the laser. One advantage of this design is its compactness and the fact that the processing of the wafer is only at one side of the substrate. This minimal dimension is required in order to maximize the speed of the device, which is determined by the RC-constants of the electronic diode structure. The active area of the modulator can be of the order of the dimensions of the incident laser beam. This is equivalent with the required sizes of ordinary lenses, mirrors with respect to the dimensions of the laser beam.

Figure 10A:
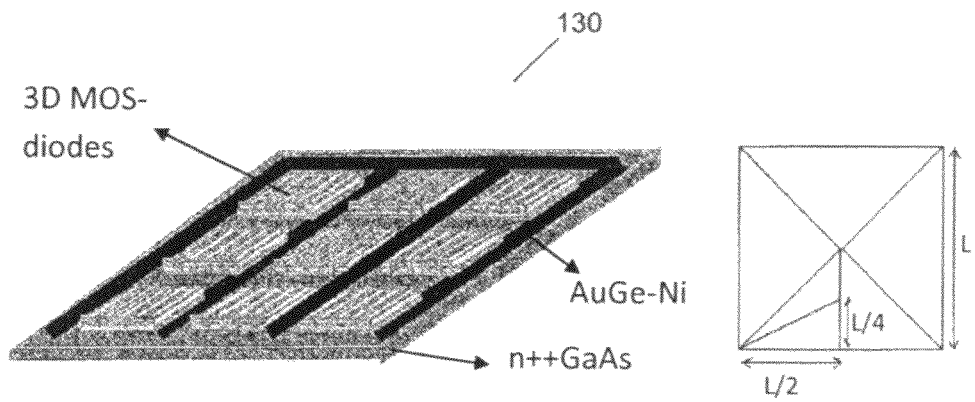
FIG. 10a shows a matrix structure implementation for the electrically controlled evanescent wave modulator, as can be used in an embodiment of the present invention.
Figure 10B:
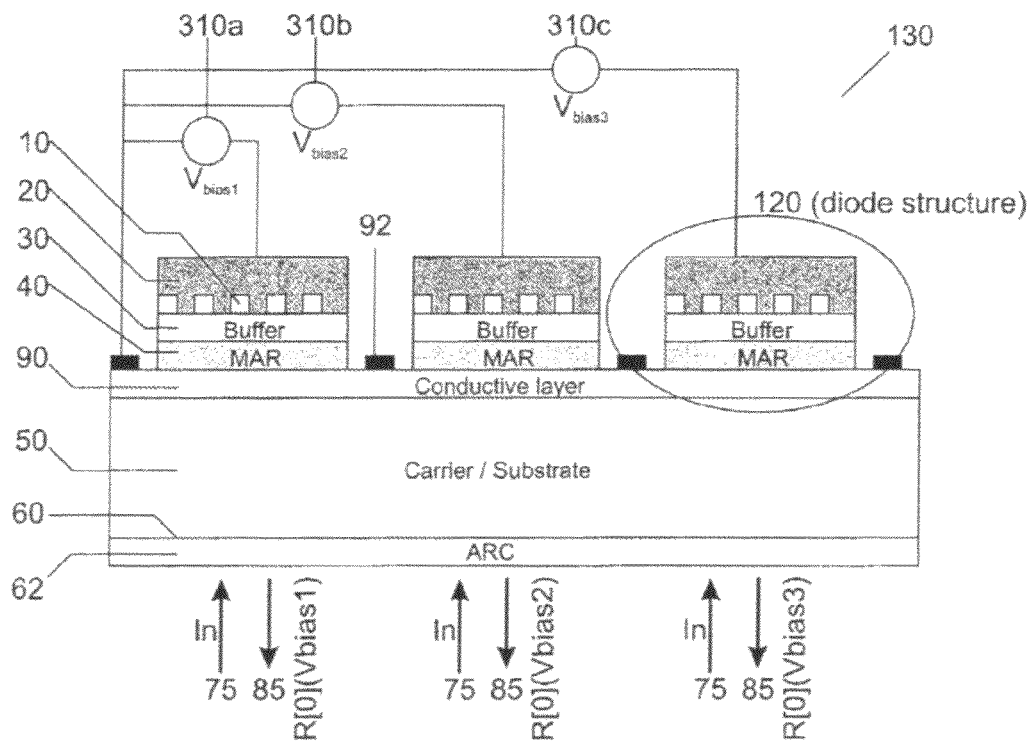
FIG. 10b shows a cross-sectional view on the diode structure of the matrix implementation of an electrically controlled evanescent wave modulator as can be used in an embodiment of the present invention, with each comprising a sub-wavelength diffraction grating covered with a reflective layer, a buffer layer, a MAR, deposit on a common conductive path layer with electrodes and a substrate or carrier, provided with an anti-reflective coating.

For larger laser beams the device scaling as depicted in the embodiment of FIG. 10$a$ may be preferred. FIG. 10$a$ illustrates a matrix structure implementation 130 for the evanescent wave modulator 120. The speed characteristics of the device may be determined by the RC-time constants of the hetero-junction diode. As the area of the device scales with the laser beam size, the switching may slow down for large laser beams. In order to prevent this speed reduction, it is preferred to develop matrices 130 of single EWA based modulators on the same substrate. In between the devices small metal strips are deposited on the conductive path layer 90. The metal strips may be designed such that the optical switching is minimally influenced. The MAR layers 40, which are at the bottom of the hetero-junction diode, of the individual modulators may be all together contacted by means of a common conductive path layer 90. Due to the matrix form the top contacts of the individual modulators may be separated. Simple wire bonding techniques can be used to contact all these top-layers. Another preferred embodiment is to deposit first an extra insulator layer on top of the bottom contact metal and then use an extra p-metallization to unify all the top contacts of the modulators. The use of a matrix structure 130 of modulators yields another advantage as by applying individual steering voltages to the different diodes one can reshape the laser beam profile in according to the spatial absorption profile of the modulator. This transverse laser mode shaping ability may enable to continuously control the individual steering voltages such that the error between a desired beam profile and a profile coming from a profile measurement means is minimized. FIG. 10b shows a cross-sectional view on the diode structure of the matrix implementation 130 of the electrically controlled evanescent wave modulator 122.

A particular example of an embodiment, wherein the evanescent wave absorption based modulator is implemented in a resonant laser cavity, is further discussed. At normal incidence the laser beam propagates straight through the MAR layer 40. Then the laser beam hits the topside of the substrate provided with the dielectric diffraction grating covered with a metal in order to transform the orthogonally incident radiation into multiple evanescent beams inside the substrate with an efficiency which depends on the material and geometrical parameters of the diffraction grating and the state of the MAR layer 40. Achieving a minimal amount of absorption when the laser beam is propagating inside the laser cavity may be of paramount importance. Two sources of absorption should be balanced with respect to each other: the absorption due to the MAR layer 40 and the absorption due to the metal layer above the diffraction grating. It is an embodiment of the invention to have a diffraction grating, which sufficiently reflects in the zero order reflection mode, when the resonant plasma layer is thin and which pumps energy into the evanescent waves when the resonant plasma layer is thick.

Figure 9:
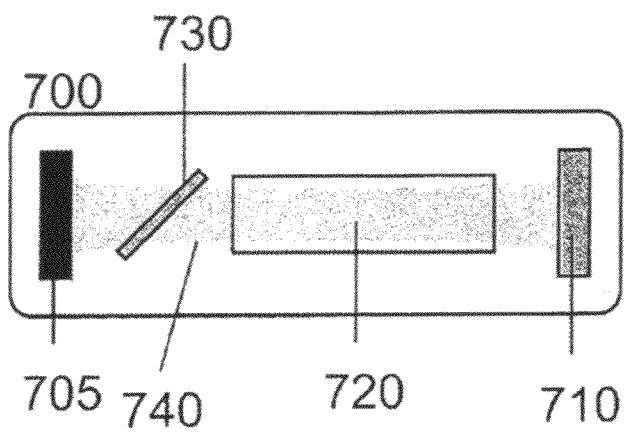
FIG. 9 shows the cross-sections of a conventional and a Q-switched laser resonator, both comprising a gain medium, a Brewster polarizer and an output coupling mirror. The back mirror of the conventional laser cavity is replaced by a modulated back mirror which takes the form of an evanescent wave modulator according to an embodiment of the present invention such that a Q-switched cavity is realized.
Figure 9:
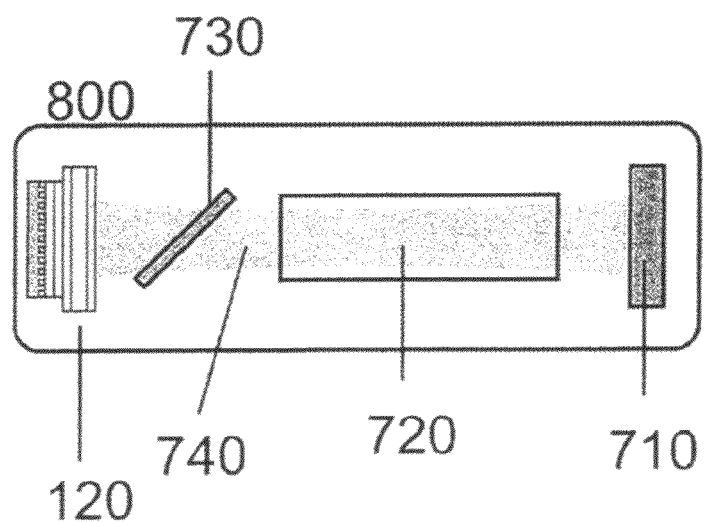

FIG. 9 shows the cross-sections of a conventional laser resonator 700 (A) and a Q-switched laser resonator 800 (B), both comprising a gain medium 720, a Brewster polarizer 730 and an output coupling mirror 710. The evanescent wave modulator 120 configured as a Q-switch as illustrated in FIG. 9 replaces the backside mirror 705 of a conventional laser cavity 700. The modulated backmirror takes the form of an evanescent wave modulator 120, thus realizing a Q-switched cavity 800. The tunable mirror-like device contains a MAR layer which can be brought into two digital states. In a first state it reflects radiation as a common mirror meaning that the laser will emit radiation. In the other electrical or optical state the device partially diffracts the incident radiation into evanescent waves, hence introducing a serious leakage in the optical path such that the optical losses are larger than the gain factor of the laser, meaning that the laser stops emitting while the DC laser ionization power is still on.

The bottom side of the substrate may be covered with an anti-reflective coating 62 as illustrated in FIG. 4A optimized for the desired laser wavelength in order to minimize reflection on the air-substrate interface. In the case of an optical excitation process this coating should preferably also be optimized as an anti-reflection coating for the optical excitation source 450. The reflection at the laser wavelength may be minimized because that fraction of the incident laser beam that is reflected at this interface cannot be modulated, which leads to an undesirable reduction of the modulation depth of the modulator.

The time sequence of the generation of an optical pulse is schematically depicted in FIG. 7. During the whole cycling time, the laser ionization power is preferentially kept constant. When the modulator is in an unbiased case, meaning that the voltage level 315 is equal to zero, the losses introduced by the electrical modulator 122 are larger (smaller) than the gain of the laser gain medium 720, the laser output 335 will be zero or the laser will not switch on. During this period population inversion can build up. At the moment 347 when the applied reverse bias voltage in the case of the electrical modulation scheme is larger (more negative) than a critical voltage 317, the reflection of the modulator exceeds a critical minimum reflection level 327 such that the losses in the cavity are compensated by the propagation gain inside the cavity leading to the building up of giant pulses. Only after a certain time delay 350 this laser pulse will obtain its maximum output level. The output power 339 of this laser pulse can be tens to hundreds of times larger than the optical power level 337 in CW operation of the laser. During the release of the optical pulse the population inversion drastically weakens. When the reverse bias voltage is again brought to zero or even a positive voltage bias 313 is applied, the losses introduced by the modulator are again bigger than the gain of the laser. Hence the optical pulse will vanish and reach again the off states 333. In this of state the population inversion will be built up again for the next pulse release.

In folded laser cavities, where multiple mirrors direct the beam through the cavity, it is obvious that some or more of these mirrors can be replaced by the invented Q-switch to convert a conventional laser into a Q-switched version. In such case the angle of incidence is rather 45 degrees with respect to the substrate-air interface. Due to the large refractive index variation between air and the substrate, the angle inside the substrate will be again small due to refraction principle, but the laser beam won't be any longer perpendicular to the growth direction of the different layers. The law of refraction indicated that for typical semiconductor substrates with a refractive index of 3 to 4 the internal propagation angle can never exceed 20 degrees, meaning that the laser beam will always penetrate the resonant layer without any absorption problem to reach the diffraction grating. Persons skilled in the art will adapt the design of the diffraction gratings for non-orthogonal angles of incidence.

In one aspect, the present invention furthermore relates to an optical system comprising a device for actively or passively modulating incident electromagnetic radiation, wherein the optical system is a detection system or a laser system. In some embodiments, the optical system is a detection system wherein besides a device as described above in any of the embodiments, the system furthermore comprises a radiation source for generating the incident electromagnetic radiation and a sensor for sensing re-radiation of the non-absorbed fraction of the evanescent field for sensing the state of absorption of the absorption layer. Such sensing may allow for detecting an environmental change in the device, which may be representative for example for a change in the design parameters of quantum confined structures (e.g. QW based SAR), temperature, pressure, humidity, physical or chemical interaction at the surface of the SAR, physical or chemical binding to receptors positioned at the SAR, etc. Alternatively, the optical system also may be a laser system, whereby the system comprises a laser resonator and an evanescent wave absorption based modulator as described above. When the modulating device is used inside a laser cavity and the correct steering pulses are fed into the device, it can yield high repetition-rate short and powerful Q-switched laser pulses. The operation principle of the device thus may be based on the interaction between an evanescent grating diffraction mode and tunable absorption region. The tuning of the absorption can be for example achieved in an electrical, optical, thermal or magnetic way. Other features and advantages may be as described in any of the embodiments as described in the first aspect.

In one aspect, the present invention also relates to a method for actively or passively modulating incident electromagnetic radiation, the method thus either resulting in a method for modulating incident radiation such as laser radiation, e.g. for generating Q-switched radiation, or in a method for sensing an environmental parameter. The method according to embodiments of the present invention comprises exciting of evanescent waves by guiding incident radiation through an absorption layer on a diffraction means. Advantageously, such guiding incident radiation comprises guiding incident radiation in a direction substantially perpendicular to the diffraction means and absorption layer, although embodiments of the present invention are not limited thereto. The method also comprises absorbing a fraction of the evanescent field in the absorption layer in the vicinity of the diffraction means depending on the state of absorption of this absorption layer, and re-radiating a non-absorbed fraction of the evanescent field in the propagating diffraction modes. The method may advantageously be performed using a device as described in any of the above embodiments, although such methods are not limited thereto. In methods where active modulation is performed, the method may comprise controlling the state of absorption of the absorption layer of the device. The absorption layer of the device may for example be optically, electrically, thermally, magnetically or acoustically controlled. In case of electrical control, the controlling may for example comprise applying an electrical field on the absorption layer and depleting, accumulating or inverting the charges of the absorption layer. In case of optically controlling, the method may for example comprise directing radiation of the excitation source to the absorption layer and changing the free carrier density in the absorption layer material as function of the excitation source intensity. In some embodiments of the present invention, the method may comprise measuring re-radiation of the non-absorbed fraction of the evanescent field for sensing the state of absorption of the absorption layer. In some embodiments of the present invention, the method may be adapted for controlling the output of a laser which contains a laser resonator and an evanescent wave absorption based modulator and the method comprises inducing high optical losses in the laser cavity by evanescent wave absorption in the modulator such that the laser switches off, building up the population inversion by the laser ionization power during the off-state of the laser, and abruptly reducing the optical losses in the laser cavity to a minimum by switching the modulator to its low absorptive state such that the losses in the cavity are compensated by the propagation gain inside the cavity leading to the building up of pulses.

Further method steps may be steps expressing the functionality of components of devices as described in any of the embodiments described above, resulting in features and advantages as described above.

Other modifications and embodiments of the inventive concept will become apparent to one skilled in the art in radiation of the teaching provided herein. It is therefore intended that the appended claims encompass any such modifications or embodiments.

The invention claimed is:

1. A device for actively or passively modulating incident radiation, comprising:
   at least one diffraction element configured for evanescent wave excitation upon irradiation with the incident radiation, and
   an absorption layer adjacent the at least one diffraction element so that the evanescent waves interact with the absorption layer, the absorption layer having alterable absorption properties so as to alter the absorption of the evanescent waves resulting in modulating of the incident radiation.

2. The device according to claim 1, wherein, upon evanescent wave excitation, element surface plasmon resonance modes are induced along the at least one diffraction element.

3. The device according to claim 1, wherein the device is configured to modulate the incident radiation in reflection, and comprising a reflective layer at a side of the diffraction element opposite the absorption layer.

4. The device according to claim 1, wherein the device is configured to modulate incident polarized laser radiation.

5. The device according to claim 1, wherein the device actively modulates incident radiation, and comprising an alteration device that alters absorption properties of the absorption layer.

6. The device according to claim 5, wherein the alteration device comprises an electrical, optical, acoustical or magnetic stimuli inducing device or a combination thereof.

7. The device according to claim 1, wherein the absorption layer comprises charges, and is integrated in a single or multiple field effect structure and wherein the state of absorption of the absorption layer is changed electrically by depleting the charges or wherein the absorption layer comprises a resonant plasma layer or wherein the absorption layer comprises a single quantum well or a quantum well stack.

8. The device according to claim 1, wherein the state of absorption of the absorption layer is changeable optically by an external excitation source due to electron-hole generation in the conduction and valence band of the absorption layer material, of which the bandgap is smaller than the photon energy of the excitation radiation.

9. The device according to claim 1, wherein the device is configured to detect an environmental change.

10. The device according to claim 9, wherein the state of absorption is directly related to an environmental or industrial process related physical parameter such that the reflected laser radiation is a measure for that parameter under investigation.

11. The device according to claim 1, wherein the structural properties of the components are configured for a given angle of incidence of laser radiation.

12. The device according to claim 1, provided with structure parameters that are configured to modulate a given diffraction order.

13. The device according to claim 1, wherein the diffraction element is a grating with a period slightly smaller than the cut-off period of a given diffraction order.

14. The device according to claim 1, embedded in a laser generating Q-switched laser radiation or embedded in a detection system detecting environmental changes.

15. A method for actively or passively modulating incident radiation, the method comprising:
   exciting of evanescent waves by guiding incident radiation through an absorption layer on a diffraction element,
   absorbing a fraction of the evanescent field in the absorption layer in the vicinity of the diffraction element depending on the state of absorption of this absorption layer, and
   re-radiating a non-absorbed fraction of the evanescent field in the propagating diffraction modes.

16. The method according to claim 15, wherein exciting of evanescent waves is carried out by guiding incident radiation in a direction substantially orthogonally to the diffraction element and the absorption layer.

17. The method according to claim 15, comprising controlling the state of absorption of an electrically controlled absorption layer or controlling the state of absorption of an optically controlled absorption layer.

18. The method according to claim 17, wherein controlling the state of absorption comprises:
   applying an electrical field on the absorption layer
   depleting, accumulating or inverting the charges of the absorption layer when the absorption layer is an electrically controlled absorption layer or wherein controlling the state of absorption comprises:
   directing radiation of the excitation source to the absorption layer
   changing the free carrier density in the absorption layer material as function of the excitation source intensity, when the absorption layer is an optically controlled absorption layer.

19. The method according to claim 15, comprising measuring re-radiation of the non-absorbed fraction of the evanescent field to sense the state of absorption of the absorption layer.

20. The method according to claim 15, including controlling the output of a laser which contains a laser resonator and an evanescent wave absorption based modulator, and comprising:
   inducing high optical losses in a cavity of the laser by evanescent wave absorption in the modulator such that the laser switches off,
   building up the population inversion by laser ionization power during the off-state of the laser
   abruptly reducing the optical losses in the laser cavity to a minimum by switching the modulator to its low absorptive state such that the losses in the cavity are compensated for by propagation gain inside the cavity leading to the building up of large pulses.

* * * * *